(12) United States Patent
Matsuzawa et al.

(10) Patent No.: US 7,923,482 B2
(45) Date of Patent: Apr. 12, 2011

(54) ULTRAVIOLET-CURABLE RESIN COMPOSITION, ULTRAVIOLET-CURABLE COATING AND COATED ARTICLE

(75) Inventors: Hiroshi Matsuzawa, Osaka (JP); Shinichi Kudo, Chiba (JP)

(73) Assignee: DIC Corporation, Tokyo (JP)

( * ) Notice: Subject to any disclaimer, the term of this patent is extended or adjusted under 35 U.S.C. 154(b) by 220 days.

(21) Appl. No.: 11/885,796

(22) PCT Filed: Mar. 6, 2006

(86) PCT No.: PCT/JP2006/304279
§ 371 (c)(1),
(2), (4) Date: May 9, 2008

(87) PCT Pub. No.: WO2006/095686
PCT Pub. Date: Sep. 14, 2006

(65) Prior Publication Data
US 2009/0176905 A1    Jul. 9, 2009

(30) Foreign Application Priority Data

Mar. 8, 2005  (JP) ................................ P2005-063739
Apr. 28, 2005 (JP) ................................ P2005-131632

(51) Int. Cl.
*C08F 2/50* (2006.01)
*C08F 2/46* (2006.01)
*C08J 3/28* (2006.01)

(52) U.S. Cl. ............ 522/99; 522/148; 522/172; 522/74; 522/134; 522/135; 522/141; 522/142; 522/144; 522/162; 522/178

(58) Field of Classification Search .................... 522/33, 522/46, 68, 99, 148, 172, 134, 135, 141, 522/142, 144, 162, 178
See application file for complete search history.

(56) References Cited

U.S. PATENT DOCUMENTS

| 4,883,852 | A   | * | 11/1989 | Masuoka et al. ............... 526/279 |
| 5,840,806 | A   | * | 11/1998 | Komazaki et al. ............. 525/101 |
| 6,248,803 | B1  |   | 6/2001  | Nakanishi et al. |
| 6,268,440 | B1  | * | 7/2001  | Kudo et al. .................... 525/477 |
| 2007/0185299 | A1 | * | 8/2007 | Motonaga et al. ............. 528/38 |
| 2009/0176905 | A1 | * | 7/2009 | Matsuzawa et al. ........... 522/46 |

FOREIGN PATENT DOCUMENTS

| EP | 0972811 A1 | 1/2000 |
| EP | 1004612 A1 | 5/2000 |
| JP | 5-214021 | 8/1993 |
| JP | 09-025455 | 1/1997 |
| JP | 11-158419 | 6/1999 |
| JP | 11-279408 | 10/1999 |
| JP | 2000-034326 | 2/2000 |
| JP | 2000-275403 | 10/2000 |
| JP | 2002-194084 | 7/2002 |
| JP | 2006-045316 | 2/2006 |
| WO | WO-96/35755 | 11/1996 |
| WO | WO 2005085373 A1 * | 9/2005 |

OTHER PUBLICATIONS

Supplementary European Search Report dated Jun. 23, 2010, issued on the corresponding European Patent Application No. 06715299.1.

* cited by examiner

*Primary Examiner* — Sanza L McClendon
(74) *Attorney, Agent, or Firm* — Edwards Angell Palmer & Dodge LLP

(57) ABSTRACT

The present invention is to provides an ultraviolet-curable resin composition which contains a composite resin (A) having a polysiloxane segment (a1) having a silanol group and/or a hydrolytic silyl group as well as a polymerizable double bond and a polymer segment (a2) other than the polysiloxane segment (a1), and a photo initiator (B). The ultraviolet-curable resin composition is able to form a cured coating film excellent in weatherability such as scratch resistance, acid resistance, alkali resistance and solvent resistance, without heating.

13 Claims, No Drawings

ULTRAVIOLET-CURABLE RESIN COMPOSITION, ULTRAVIOLET-CURABLE COATING AND COATED ARTICLE

TECHNICAL FIELD

The present invention relates to an ultraviolet-curable resin composition usable as coating media, adhesive agents or the like in various fields including buildings, an ultraviolet-curable coating containing the ultraviolet-curable resin composition and a coated article on which the ultraviolet-curable coating is coated.

BACKGROUND ART

In recent years, there has been a growing demand for the development of so-called highly durable coating media which can form a coating film excellent in durability such as scratch resistance, acid resistance, alkali resistance and solvent resistance from various fields including the exteriors of buildings. Reportedly, the highly durable coating media include a polysiloxane-based coating and a fluoroolefin-based coating. Among other things, the polysiloxane-based coating has been desirably used in various fields because the coating is free of halogen atoms and able to form a coating film excellent in water repellency, in addition to the above-described durability.

A resin composition to be used in the above polysiloxane-based coating includes a curable resin composition containing, for example, a resin obtained by subjecting to condensation reaction a polymer having a hydrolytic silyl group and a functional group other than the hydrolytic silyl group and a polysiloxane having a hydroxyl group (silanol group) bonded to silicon atoms and/or a hydrolytic group (hydrolytic silyl group) bonded to silicon atoms and a compound having a functional group reacting with functional groups contained in the resin as a curing agent. It has been disclosed that this curable resin composition is used to form a coating film excellent in acid resistance, scratch resistance and others (refer to Patent Document 1 and Patent Document 2, for example).

The curable resin composition disclosed in Patent Document 1 and Patent Document 2 forms a cured coating through a hydrolysis-condensation reaction with the resin and the curing agent. This hydrolysis-condensation reaction can take place, for example, at temperatures of 0 to 30° C. However, in order to effect the curing at these temperatures, it is necessary to allow a coating to stand for about one week or so after being coated, resulting in a poor painting efficiency. As a result, for effectively obtaining a cured coating film by using the curable resin composition, for example, as in Patent Document 1, after being coated, an article to be coated is heated at a high temperature of 140° C. However, where a coating containing the curable resin composition is used, for example, it is difficult to heat the coating film after being coated on exterior walls of buildings. It is, therefore, difficult to form a sufficiently cured coating film.

Further, the polysiloxane-based coating now has been evaluated for possible uses other than a coating for the exteriors of buildings, for example, that for vehicle components. These components include bumpers and side view mirrors. Base materials of the components, however, often include plastic materials such as polypropylene and polycarbonate, which are in general vulnerable to heating. Therefore, there is a problem in that where the polysiloxane-based coating described in Patent Document 1, Patent Document 2 or the like is painted and thermally cured, the base materials may deform or discolor.

There is disclosed a coating which contains a siloxane copolymer made up of, for example, a siloxane polymer and a polymer block having a vinyl group on the side chain, as a polysiloxane-based coating which is not required for heating on curing a coating film (for example, refer to Patent Document 3). The coating disclosed in Patent Document 3 will form a cured coating film through radiation of ultraviolet rays or the like after being coated, thereby the coating can be used in an application where it is difficult to carry out heating and curing, for example, as a coating for the exterior of buildings and that for heat-sensitive base materials. However, a coating film obtained by coating such coating media that contain the siloxane copolymer disclosed in Patent Document 3 is not sufficient in weatherability such as scratch resistance, acid resistance, alkali resistance and solvent resistance, as compared with a coating film obtained by using a conventional coating high in weatherability (for example, the coating disclosed in Patent Document 1, Patent Document 2 or others).

Incidentally, regarding highly durable coating media, the coating media based on organic solvents are now being replaced by those based on aqueous solvents in view of global environmental protection. Polysiloxane-based aqueous coating media include, for example, a curable resin composition containing a composite resin constituted with a polysiloxane segment and a polymer segment having a hydrophilic group and a compound having a functional group reacting with a functional group contained in the resin as a curing agent. It is reported that this curable resin composition is able to form a coating film excellent in storage stability, room-temperature curing, gloss retention and durability (for example, refer to Patent Document 4).

However, the curable resin composition disclosed in Patent Document 4 is cured through a hydrolysis-condensation reaction of the composite resin and the curing agent. Therefore, in order to obtain excellent physical properties of coating film as described above, it is necessary to provide a step where a coating is allowed to stand for curing for about one week at room temperature after being coated as in Patent Document 1 or Patent Document 2, resulting in a poor painting efficiency. As means for improving the efficiency of painting work, there is proposed a method for heating a coating at a high temperature after the coating containing a curable resin composition is coated, thereby promoting the formation of a cured coating. For example, where a coating containing the curable resin composition is used for the exteriors of buildings, it is difficult to heat the coating film after being coated on the exteriors of buildings. Thus, it is difficult to form a fully cured coating film.

Patent Document 1: International Publication No. WO/96-035755 Pamphlet
Patent Document 2: Japanese Published Unexamined Patent Application No. 9-025455
Patent Document 3: Japanese Published Unexamined Patent Application No. 2000-34326
Patent Document 4: Japanese Published Unexamined Patent Application No. 11-279408]

DISCLOSURE OF THE INVENTION

The present invention is to provide an ultraviolet-curable resin composition which can form a cured coating film excellent in weatherability such as scratch resistance, acid resistance, alkali resistance and solvent resistance, without heating, thereby solving the above-described problem.

The inventor and others have made performed intensive research to find the following.

(1) Since the siloxane copolymer disclosed in Patent Document 3 has a vinyl group in a polymer block other than a siloxane polymer, a cross linking reaction resulting from ultraviolet ray radiation proceeds only at a part made up of polymer blocks other than a siloxane polymer. Thus, the cured coating film is not sufficient in weatherability such as scratch resistance, acid resistance, alkali resistance and solvent resistance.

(2) In an attempt to allow reactions to proceed between siloxane polymers in the siloxane copolymer disclosed in Patent Document 2 for improving weatherability, the siloxane polymers substantially have a straight-chain polydialkyl siloxane structure such as a polydimethyl siloxane, and it is, therefore, difficult to allow the reactions to proceed between the siloxane polymers having the straight-chain polydialkyl siloxane structure.

(3) By allowing a composite resin having a polysiloxane segment and polymer segments other than the polysiloxane segment to contain a polymerizable double bond in the polysiloxane segment, by which a siloxane segment is also cured by ultraviolet ray radiation, a contribution is made to improvement in weatherability such as scratch resistance, acid resistance, alkali resistance and solvent resistance of a cured coating.

(4) Further, the polysiloxane segment is made into a polysiloxane segment which contains a silanol group (a hydroxyl group bonded to silicon atoms) and a hydrolytic silyl group (a hydrolytic group bonded to silicon atoms), by which a hydrolysis-condensation reaction proceeds between the hydroxyl group in the silanol group and/or the hydrolytic group in the hydrolytic silyl group. The hydrolysis-condensation reaction improves the crosslink density of the polysiloxane structure. The thus improved crosslink density contributes not only to the curing of coating film due to the polymerizable double bond but also to improvement in weatherability such as scratch resistance, acid resistance, alkali resistance and solvent resistance. Still further, the curing of coating film due to the hydrolysis-condensation reaction is to assist the curing of coating by the ultraviolet ray radiation, thereby eliminating the necessity of carrying out a heating step to facilitate the hydrolysis-condensation reaction.

(5) A hydrophilic group is introduced into the polysiloxane segment of the composite resin and/or polymer segments other than the polysiloxane segment, thereby making it possible to give a water-soluble or a water-dispersed ultraviolet-curable resin composition.

The present invention has been made on the basis of the above-described findings.

More specifically, an object of the present invention is to provide an ultraviolet-curable resin composition which contains a composite resin (A) having a polysiloxane segment (a1) having a silanol group and/or a hydrolytic silyl group as well as a polymerizable double bond, and a polymer segment (a2) other than the polysiloxane segment (a1), and a photo initiator (B).

Another object of the present invention is to provide an ultraviolet-curable coating containing the ultraviolet-curable resin composition.

Still another object of the present invention is to provide a coated article obtained by coating the ultraviolet-curable coating.

The ultraviolet-curable resin composition of the present invention is to provide a cured coating film excellent in durability through two curing mechanisms, that is, ultraviolet ray curing and improving crosslink density of a coating film by condensation reactions of a silanol group and/or a hydrolytic silyl group. Therefore, this composition can be favorably used as a coating for the exteriors of buildings for which it is difficult to use conventional thermosetting resin compositions or as a coating for base materials which easily thermally deform. Further, this composition offers a variety of applications such as a photocatalysis coating agent, ink, adhesive agent and binder resins for various films including a gas barrier film.

BEST MODE FOR CARRYING OUT THE INVENTION

The ultraviolet-curable resin composition of the present invention is an ultraviolet-curable resin composition which contains a composite resin (A) having a polysiloxane segment (a1) having a silanol group and/or a hydrolytic silyl group as well as a polymerizable double bond, and a polymer segment (a2) other than the polysiloxane segment (a1), and a photo initiator (B).

The composite resin (A) of the present invention includes, for example, a composite resin having a graft structure in which the polysiloxane segment (a1) is chemically bonded to the side chain of the polymer segment (a2) and a composite resin having a block structure in which the polysiloxane segment (a1) is chemically bonded to the terminal of the polymer segment (a2).

The polysiloxane segment (a1) contained in the composite resin (A) has polymerizable double bonds in the polysiloxane segment (a1). Where the composite resin (A) is subjected to ultraviolet ray radiation in the presence of the photo initiator (B) to be described later, cross linking reaction will proceed between the polymerizable double bonds in the polysiloxane segment (a1), thereby resulting in the formation of a stronger polysiloxane structure high in crosslink density. As a result, the thus obtained coating film is excellent in durability such as scratch resistance, acid resistance, alkali resistance and solvent resistance.

The polymerizable double bond includes, for example, a vinyl group, (meta) acryloyl group and the like. The polymerizable double bonds are present preferably in two in the polysiloxane segment (a1), more preferably in 3 to 200, and in particular preferably from 3 to 50. Further, a composite resin in which two or more polymerizable double bonds are present as the composite resin (A) is used, by which scratch resistance, acid resistance, alkali resistance and solvent resistance of the obtained coating film can be improved.

Further, as the polysiloxane segment (a1), preferable is a polysiloxane segment which contains a polymerizable double bond from 1 to 40% by weight on the basis of the weight of the polysiloxane segment because an ultraviolet-curable resin composition to provide a curable coating film excellent in durability can be obtained, and more preferable is a polysiloxane segment which contains the double bonds from 5 to 30% by weight. The polysiloxane segment (a1) has a silanol group and/or a hydrolytic silyl group.

In association with the ultraviolet ray curing, a hydrolysis-condensation reaction will proceed between the hydroxyl group in a silanol group and the hydrolytic group in a hydrolytic silyl group, and the obtained coating film is increased in crosslink density of the polysiloxane structure, thereby making it possible to form a coating film excellent in solvent resistance.

The silanol group referred to in the present invention is a silicon-containing group having a hydroxyl group directly bonded to silicon atoms.

The hydrolytic silyl group referred to in the present invention is a silicon-containing group having a hydrolytic group directly bonded to silicon atoms, more specifically, including groups expressed by the following general formula.

[General formula 1]

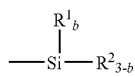
(S-1)

(wherein $R^1$ denotes a monovalent organic group such as an alkyl, aryl or aralkyl group and $R^2$ denotes a halogen atom, an alkoxy, acyloxy, phenoxy, aryloxy, mercapto, amino, amide, aminooxy, iminooxy or alkenyloxy group. Further, b is an integer of 0 to 2).

The above-described alkyl group includes, for example, a methyl, ethyl, propyl, isopropyl, butyl, isobutyl, sec-butyl, tert-butyl, pentyl, isopentyl, neopentyl, tert-pentyl, 1-methylbutyl, 2-methylbutyl, 1,2-dimethylpropyl, 1-ethylpropyl, hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl, and 1-ethyl-1-methylpropyl group.

The aryl group includes, for example, a phenyl, naphthyl, 2-methylphenyl, 3-methylphenyl, 4-methylphenyl, 4-vinylphenyl, and 3-isopropylphenyl group.

The aralkyl group includes, for example, a benzyl, diphenylmethyl, and naphthylmethyl group.

The halogen atom includes, for example, a fluorine, chlorine, bromine and iodine atom.

The alkoxy group includes, for example, a methoxy, ethoxy, propoxy, isopropoxy, butoxy, secondary butoxy and tertiary butoxy group.

The acyloxy group includes, for example, formyloxy, acetoxy, propanoyloxy, butanoyloxy, pyvaroyloxy, pentanoyloxy, phenylacetoxy, acetoacetoxy, benzoyloxy, and naphtoyloxy.

The aryloxy group includes, for example, phenyloxy, and naphtyloxy.

The alkenyloxy group includes, for example, a vinyloxy, aryloxy, 1-propenyloxy, isopropenyloxy, 2-butenyloxy, 3-butenyloxy, 2-petenyoxy, 3-methyl-3-butenyloxy, and 2-hexenyloxy groups.

The hydrolytic group in the hydrolytic silyl group contained in the polysiloxane segment (a1) includes, for example, a halogen atom, an alkoxy, substituted alkoxy, acyloxy, phenoxy, mercapto, amino, amide, aminooxy, iminooxy, and alkenyloxy groups. These groups are hydrolyzed, by which a hydrolytic silyl group is converted to a silanol group. Next, the hydroxyl group of the silanol group is used to effect dehydration and condensation, resulting in an improved crosslink density of the polysiloxane segment (a1).

The polysiloxane segment (a1) is preferably a polysiloxane segment having a structural unit expressed by the following general formula (S-2) and/or by the following general formula (S-3). A polysiloxane segment having the structural unit expressed by the following general formula (S-2) and/or the following general formula (S-3) has a three-dimensional network polysiloxane structure. Therefore, a composite resin having the above-described polysiloxane segment is used as a composite resin, thereby making it possible to provide an ultraviolet curing-type resin composition capable of forming a coating film excellent in solvent resistance and others.

[General formula 2]

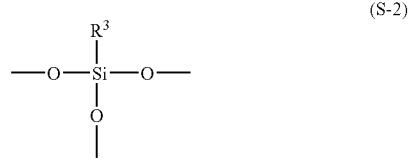
(S-2)

[General formula 3]

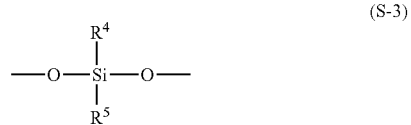
(S-3)

(In the general formula (S-2) and (S-3), $R^3$, $R^4$ and $R^5$ each independently denote an alkyl group of 1 to 6 carbon atoms, a cycloalkyl group or an aryl group of 3 to 8 carbon atoms and an aralkyl group of 7 to 12 carbon atoms).

The alkyl group of 1 to 6 carbon atoms includes, for example, a methyl, ethyl, propyl, isopropyl, butyl, isobutyl, sec-butyl, tert-butyl, pentyl, isopentyl, neopentyl, tert-pentyl, 1-methylbutyl, 2-methylbutyl, 1,2-dimethylpropyl, 1-ethylpropyl, hexyl, isohexyl, 1-methylpentyl, 2-methylpentyl, 3-methylpentyl, 1,1-dimethylbutyl, 1,2-dimethylbutyl, 2,2-dimethylbutyl, 1-ethylbutyl, 1,1,2-trimethylpropyl, 1,2,2-trimethylpropyl, 1-ethyl-2-methylpropyl, and 1-ethyl-1-methylpropyl groups.

The cycloalkyl group of 3 to 8 carbon atoms includes, for example, a cyclopropyl, cyclobutyl, cyclopentyl, and cyclohexyl groups.

The aryl group includes, for example, a phenyl, naphthyl, 2-methylphenyl, 3-methylphenyl, 4-methylphenyl, 4-vinylphenyl, and 3-isopropylphenyl groups.

The aralkyl group of 7 to 12 carbon atoms includes, for example, a benzyl, diphenylmethyl, and naphthylmethyl groups.

The polysiloxane segment having structural units expressed by the general formula (S-2) and/or the following general formula (S-3) includes, for example, those having the following structures.

[General formula 4]

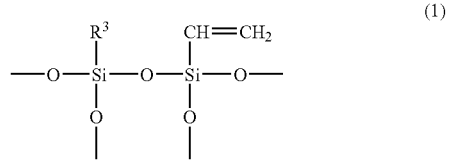
(1)

(2)

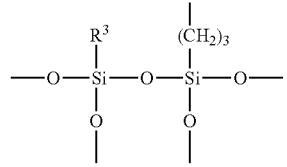

-continued

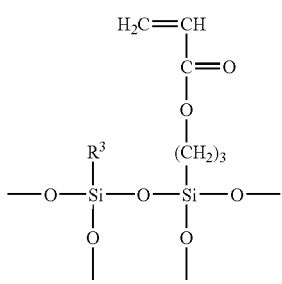

[General formula 5]

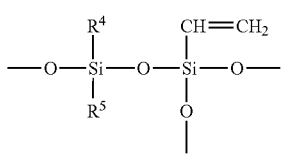

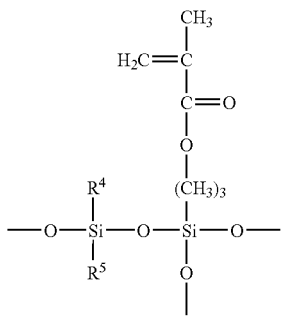

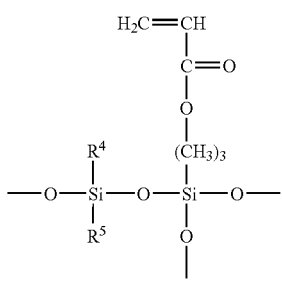

[General formula 6]

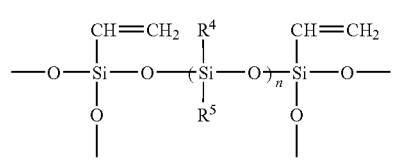

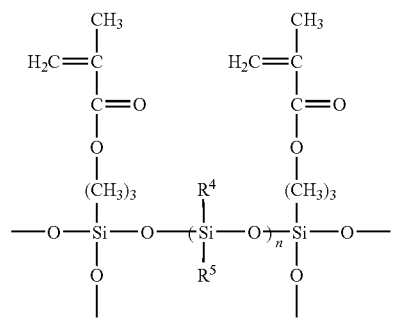

-continued

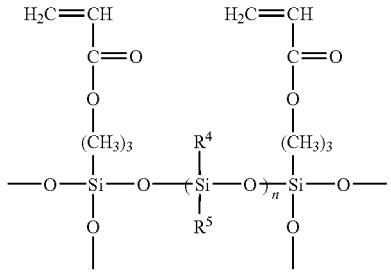

(In the general formula (7), (8) and (9), n is preferably an integer of 1 to 200, more preferably an integer of 1 to 10, and in particular preferably an integer of 1 to 4).

The polymer segment (a2) other than the polysiloxane segment (a1) contained by the composite resin (A) includes, for example, a vinyl polymer segment such as an acryl polymer, fluoroolefin polymer, vinylester polymer, aromatic vinyl polymer or polyofefin polymer and a polymer segment such as a polyurethane polymer segment, polyester polymer segment or polyether polymer segment. The vinyl polymer segment and/or the polyurethane polymer segment are in particular preferable.

The polymer segment (a2) may contain various functional groups, whenever necessary, to such an extent that will not influence the effect of the present invention. These functional groups include, for example, a carboxyl, blocked carboxyl, carboxylic acid anhydride, tertiary amino, hydroxyl, blocked hydroxyl, cyclocarbonate, epoxy, carbonyl, primary amide, secondary amide and carbamate group, as well as a functional group which is expressed by the following formula (S-4).

[General formula 7]

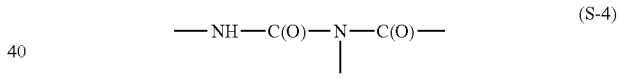

A composite resin having a polymer segment having the functional group as the polymer segment (a2) may be appropriately selected, by which a curable resin composition other an ultraviolet-curable resin composition may be used together with the ultraviolet-curable resin composition of the present invention. More specifically, a cured coating film obtained by radiating ultraviolet rays is further subjected to heating or allowed to stand in the air, by which thermal cure reactions or others between the functional groups are allowed to proceed to promote further curing, thereby making it possible to improve acid resistance, solvent resistance and alkali resistance of the obtained coating film. Further, the polymer segment (a2) may contain polymerizable double bonds such as a vinyl group, and (meta)acryloyl group.

The composite resin (A) used in the present invention includes a composite resin in which the polysiloxane segment (a1) and the polymer segment (a2) are bonded together in a structure expressed by the following formula (S-5) and a composite resin bonded in a structure expressed by the following formula (S-6). A composite resin in which the polysiloxane segment (a1) and the polymer segment (a2) are bonded in a structure expressed by the following formula (S-5) is in particular preferable because an ultraviolet-curable resin composition is obtained which can form a coating film excellent in alkali resistance.

[General formula 8]

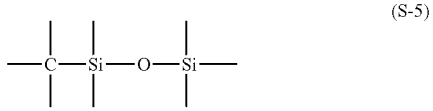

(S-5)

(In the formula (S-5), the carbon atom is a carbon atom which constitutes the polymer segment (a2), and two silicon atoms are silicon atoms which constitute the polysiloxane segment (a1)).

[General formula 9]

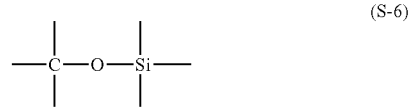

(S-6)

(In the formula (S-6), the carbon atom is a carbon atom which constitutes the polymer segment (a2), and the silicon atom is a silicon atom which constitutes the polysiloxane segment (a1)).

The polysiloxane segment (a1) in the composite resin (A) of the present invention is preferably contained in a range of 10 to 95% by weight, with the weight of the composite resin (A) being a reference, more preferably 30 to 95% by weight and in particular preferably from 30 to 75% by weight, because an ultraviolet-curable resin composition capable of forming a cured coating film excellent in durability can be obtained.

The composite resin (A) of the present invention may be produced by various methods, and preferably by a method expressed by any of the following methods described in (1) to (3).

(1) A method in which a polymer segment (a2-1) containing a silanol group and/or a hydrolytic silyl group is in advance prepared as a material of the polymer segment (a2), Next, the polymer segment (a2-1) is mixed with a silane compound having a silanol group and/or a hydrolytic silyl group as well as a silane compound with polymerizable double bonds, thereby carrying out hydrolysis-condensation reaction.

(2) A method in which a polymer segment (a2-1) containing a silanol group and/or a hydrolytic silyl group is in advance prepared as a material of the polymer segment (a2), a silane compound which contains a silane compound having a silanol group and/or a hydrolytic silyl group as well as a polymerizable double bond is subjected to a hydrolysis-condensation reaction, thereby preparing in advance a polysiloxane (a1-1), and the polymer segment (a2-1) and the polysiloxane (a1-1) are then mixed to carry out the hydrolysis-condensation reaction.

(3) A method in which the polymer segment (a2-1) is mixed with a silane compound containing a silane compound having a silanol group and/or a hydrolytic silyl group and a polymerizable double bond as well as the polysiloxane (a1-1), thereby carrying out the hydrolysis-condensation reaction.

The hydrolysis-condensation reaction described in the methods of (1) to (3) for preparing the composite resin (A) is allowed to proceed in various ways. A way of allowing the reaction to proceed by supplying water and a catalyst in the above method is preferable because of its simplicity.

It is to be noted that the hydrolysis-condensation reaction is a condensation reaction in which the hydrolytic group is partially hydrolyzed by the effect of water and the like, to form a hydroxyl group, and the reaction proceeds between these hydroxyl groups or between the hydroxyl group and the hydrolytic group.

The polymer segment (a2-1) containing the silanol group and/or the hydrolytic silyl group includes, for example, an acryl polymer containing a silanol group and/or a hydrolytic silyl group, a fluoroolefin polymer containing a silanol group and/or a hydrolytic silyl group, a vinyl ester-based polymer containing a silanol group and/or a hydrolytic silyl group, a vinyl polymer containing a silanol group and/or a hydrolytic silyl group such as an aromatic vinyl polymer containing a silanol group and/or a hydrolytic silyl group and a polyofefin polymer containing a silanol group and/or a hydrolytic silyl group, a polyurethane polymer containing a silanol group and/or a hydrolytic silyl group, a polyester polymer containing a silanol group and/or a hydrolytic silyl group, and a polyether polymer containing a silanol group and/or a hydrolytic silyl group. It is preferable to use a vinyl polymer containing a silanol group and/or a hydrolytic silyl group and a polyurethane polymer containing a silanol group and/or hydrolytic silyl group. It is more preferable to use an acryl polymer containing a silanol group and/or a hydrolytic silyl group.

Where an acryl polymer is used as the polymer segment (a2-1) containing the silanol group and/or the hydrolytic silyl group, the acryl resin may be obtained through polymerization of other vinyl-based monomers, for example, with a vinyl-based monomer containing a silanol group and/or a hydrolytic silyl group, whenever necessary.

The vinyl-based monomer containing the silanol group and/or the hydrolytic silyl group includes, for example, vinyl trimethoxy silane, vinyl triethoxy silane, vinyl methyldimethoxy silane, vinyl tri(2-methoxy ethoxy)silane, vinyl triacetoxysilane, vinyl trichlorosilane, 2-trimethoxy silylethylvinyl ether, 3-(meta)acryloyl oxypropyltrimethoxy silane, 3-(meta)acryloyl oxypropyltriethoxy silane, 3-(meta)acryloyl oxypropylmethyldimethoxy silane, and 3-(meta)acryloyl oxypropyl trichloro silane. Vinyl trimethoxy silane and 3-(meta)acryloyl oxypropyltrimethoxy silane are in particular preferable because a hydrolysis reaction can easily be carried out and by-products after the reaction can easily be removed.

Other vinyl-based monomers which may be used, whenever necessary, include, for example, an acryl-based monomer. More specifically, they include, alkyl(meta)acrylates having an alkyl group of carbon atoms of 1 to 22 such as methyl(meta)acrylate, ethyl(meta)acrylate, n-propyl(meta)acrylate, n-butyl(meta)acrylate, isobutyl(meta)acrylate, tert-butyl(meta)acrylate, 2-ethylhexyl(meta)acrylate, lauryl (meta)acrylate; aralkyl(meta)acrylates such as benzyl(meta)acrylate and 2-phenylethyl(meta)acrylate; cycloalkyl(meta) acrylates such as cyclohexyl(meta)acrylate and isobornyl (meta)acrylate; ω-alkoxy alkyl(meta)acrylates such as 2-methoxy ethyl(meta)acrylate and 4-methoxy butyl(meta)acrylate; aromatic vinyl-based monomers such as styrene, p-tert-butylstyrene, α-methylstyrene and vinyl toluene; carboxylate vinyl esters such as vinyl acetate, vinyl propionate, vinyl pivalate and vinyl benzoate; crotonic acid alkyl esters such as methyl crotonate and ethyl crotonate; unsaturated dibasic acid dialkyl esters such as dimethyl malate, di-n-butylmalate, dimethyl fumarate and dimethyl itaconate; α-olefines such as ethylene and propylene; fluoroolefins such as fluoridated vinylidene, tetrafluoroethylene, hexafluoropropylene and chlorotrifluoroethylene; alkyl vinyl ethers such as ethylvinyl ether and n-butylvinyl ether; cycloalkyl vinyl ethers such as cyclopentyl vinyl ether and cyclohexylvinyl ether; and tertiary amide group-containing monomers such as N,N-dimethyl (meta)acryl amide, N-(meta)acryloyl morpholine, N-(meta)acryloyl pyrrolidine and N-vinyl pyrolidone.

Where a vinyl polymer is used as the polymer segment (a2-1), the vinyl polymer may be produced through polymerization by various polymerization methods, for example, mass radical polymerization, solution radical polymerization and nonaqueous dispersion radical polymerization. Where the composite resin (A) and the photo initiator (B) to be described later are dissolved into an organic solvent to give an ultraviolet-curable resin composition as the ultraviolet-curable resin composition of the present invention, the vinyl monomer is subjected to radical polymerization in the organic solvent to give a vinyl polymer, thereafter, the photo initiator (B) is added thereto, thereby obtaining an ultraviolet-curable resin composition which is more easily dissolved into the organic solvent. Therefore, this method is preferable.

The organic solvent includes, for example, aliphatic or cyclic aliphatic-based hydrocarbons such as n-hexane, n-heptane, n-octane, cyclohexane and cyclopentane; aromatic hydrocarbons such as toluene, xylene and ethyl benzene; alcohols such as ethanol, n-butanol, ethylene glycol monomethylether, propyleneglycol monomethylether; esters such as ethyl acetate, n-butyl acetate, n-amyl acetate, ethylene glycol monomethylether acetate, propyleneglycol monomethylether acetate; ketones such as acetone, methylethyl ketone, methylisobutyl ketone, methyl n-amylketone, and cyclohexane; polyalkyleneglycol dialkyl ethers such as diethylene glycol dimethyl ether, diethylene glycol dibutyl ether; ethers such as 1,2-dimethoxy ethane, tetrahydrofuran, and dioxane; N-methylpyrolidone, dimethylformamide, dimethyl acetoamide and ethylene carbonate. They may be used solely or in two or more combinations thereof.

Further, where the vinyl monomer is polymerized through radical polymerization, a polymerization initiator may be used, whenever necessary. The initiator includes, azo compounds such as 2,2'-azobis(isobutyronitrile), 2,2'-azobis(2,4-dimethyl valeronitrile), 2,2'-azobis(2-methylbutyronitrile); and peroxides such as tert-butylperoxy pivalate, tert-butylperoxy benzoate, tert-butylperoxy 2-ethyl hexanoate, di-tert-butylperoxide, cumen hydroperoxide, and diisopropylperoxy carbonate.

The polymer segment (a2-1) is preferably a polymer segment with a number average molecular weight of 500 to 200,000, more preferably a polymer segment with a number average molecular weight of 700 to 100,000, in particular preferably a polymer segment with a number average molecular weight of 1,000 to 50,000. The polymer segment (a2-1) with a number average molecular weight in the above-described range is used, thereby making it possible to prevent an increase in viscosity and gelatinization on production of the composite resin (A) and also provide an ultraviolet-curable resin composition for forming a coating film excellent in durability.

A polymer segment having a polymerizable double bond group is used as the polymer segment (a2) constituting the composite resin (A) used in the present invention, by which an ultraviolet-curable resin composition having a cured coating higher in durability can be obtained. A polymer segment having a polymerizable double bond can be obtained by a method in which, for example, a polymer segment having a carboxyl group as the polymer segment (a2-1) is used, and a compound having the polymerizable double bond and an epoxy group at the same time, for example, glycidyl methacrylate, is added thereto and allowed to react therewith.

The silane compound used in the above method (1) which contains a silane compound having a silanol group and/or a hydrolytic silyl group as well as a polymerizable double bond includes, for example, vinyl trimethoxy silane, vinyl triethoxy silane, vinyl methyldimethoxy silane, vinyl tri(2-methoxy ethoxy)silane, vinyl triacetoxy silane, vinyl trichloro silane, 2-trimethoxy silylethylvinyl ether, 3-(meta)acryloyl oxypropyltrimethoxy silane, 3-(meta)acryloyl oxypropyltriethoxy silane, 3-(meta)acryloyl oxypropylmethyldimethoxy silane, and 3-(meta)acryloyl oxypropyltrichloro silane.

It is preferable to use vinyl trimethoxy silane and 3-(meta)acryloyl oxypropyltrimethoxy silane as a silane compound having the silanol group and/or the hydrolytic silyl group as well as a polymerizable double bond, because the hydrolysis-condensation reaction can be progressed easily and by-products after the reaction can be easily removed.

The silane compound used in the above-described method (1) may contain, whenever necessary, a silane compound other than the silane compound having the silanol group and/or the hydrolytic silyl group as well as a polymerizable double bond. The above-described silane compound includes, for example, various organo trialkoxy silanes such as methyl trimethoxy silane, methyl triethoxy silane, methyl trin-butoxy silane, ethyl trimethoxy silane, n-propyl trimethoxy silane, iso-butyl trimethoxy silane, cyclohexyl trimethoxy silane, phenyl trimethoxy silane and phenyl triethoxy silane; various diorgano dialkoxy silanes such as dimethyl dimethoxy silane, dimethyl diethoxy silane, dimethyldi-n-butoxy silane, diethyl dimethoxy silane, diphenyl dimethoxy silane, methyl cyclohexyl dimethoxy silane and methyl phenyldimethoxy silane; and chloro silanes such as methyl trichloro silane, ethyl trichloro silane, phenyl trichloro silane, vinyl trichloro silane, dimethyl dichloro silane, diethyl dichloro silane and diphenyl dichloro silane.

The above-described silane compound is preferably organo trialkoxysilane and diorgano dialkoxysilane, because the hydrolysis reaction can be progressed easily and by-products after the reaction can be easily removed.

Further, a tetrafunctional alkoxy silane compound such as tetra methoxy silane, tetra ethoxy silane or tetra n-propoxy silane and a partial hydrolysis condensate of the tetrafunctional alkoxy silane compound may be used together as the above-described silane compound as long as they will not influence the effect of the present invention. Where the tetrafunctional alkoxy silane compound or the partial hydrolysis condensate is used, it is preferable that silicon atoms contained in the tetrafunctional alkoxy silane compound be used in such a range not to exceed 20 mol % with respect to the whole silicon atoms constituting the polysiloxane segment (a1).

Still further, the above-described silane compound may also contain a metal alkoxide compound other than silicon atoms such as boron, titanium, zirconium and aluminum as long as it will not impair the effect of the present invention. It is preferable that metal atoms of the metal alkoxide compound be used together, for example, in such a range not to exceed 25 mol % with respect to the whole silicon atoms constituting the polysiloxane segment (A).

In addition, as described in the method (2) or the method (3), a silane compound which contains a silane compound having a silanol group and/or a hydrolytic silyl group as well as a polymerizable double bond is in advance subjected to a hydrolysis-condensation reaction, thereby obtaining a partial hydrolysis condensate or a hydrolysis condensate, that is, a polysiloxane (a-1), Next, a polymer segment (a2-1) is mixed with the polysiloxane (a-1), and the resultant is subjected to the hydrolysis-condensation reaction to prepare a composite resin (A).

The polysiloxane (a1) may be obtained by procedures in which a silane compound which contains a silane compound having, for example, a silanol group and/or a hydrolytic silyl group as well as a polymerizable double bond is subjected to the hydrolysis-condensation reaction, whenever necessary, together with other silane compounds. The silane compound having a silanol group and/or a hydrolytic silyl group as well as a polymerizable double bond includes, for example, a silanol group and/or a hydrolytic silyl group used in the method (1) and a silane compound having a polymerizable double bond. Other silane compounds include, for example, other silane compounds which are used in the method (1), whenever necessary.

In the methods (1) through (3), a catalyst may be used in subjecting the polymer segment (a2-1) and the silane compound and/or the polysiloxane (a1-1) to hydrolysis-condensation reaction. The catalyst includes, for example, inorganic acids such as hydrochloric acid, sulfuric acid and phosphoric acid; organic acids such as p-toluene sulfuric acid, monoisopropyl phosphate and acetic acid; inorganic bases such as sodium hydroxide and potassium hydroxide; ester titanates such as tetraisopropyl titanate and tetrabutyl titanate; compounds containing various types of basic nitrogen atoms such as 1,8-diazabicyclo[5.4.0]undec-7-ene (DBU), 1,5-diazabicyclo[4.3.0]non-5-ene (DBN), 1,4-diazabicyclo[2.2.2]octane (DABCO), tri-n-butyl amine, dimethyl benzyl amine, monoethanol amine, imidazole, and 1-methyl imidazole; quaternary ammonium salts such as tetramethyl ammonium salt, tetrabutyl ammonium salt, dilauryl dimethyl ammonium salt, which have chloride, bromide, carboxylate or hydroxide as a counter anion; tin carboxylates such as dibutyl tin diacetate, dibutyl tin dioctoate, dibutyl tin dilaurate, dibutyl tin diacetyl acetonate, tin octylic acid and tin stearate. The catalyst may be used solely or in combination of two or more of them.

The catalyst is used preferably in a range of 0.0001 to 10% by weight with respect to a total quantity of the silane compound and/or the polysiloxane (a1-1), more preferably from 0.0005 to 3% by weight, and in particular preferably from 0.001 to 1% by weight.

Further, in the methods (1) through (3), water may be added to a reaction system when the hydrolysis-condensation reaction is allowed to proceed. Water is added appropriately in a quantity of 0.05 mole or more with respect to one mole of a hydrolytic group and a hydroxyl group contained in the silane compound or the like, preferably 0.1 mole or more and in particular preferably 0.5 mole or more.

The above-described catalyst and water may be supplied all at once or gradually. Alternatively, they may be mixed in advance before supply.

In the methods (1) through (3), a reaction temperature at which the polymer segment (a2-1) and the silane compound and/or polysiloxane (a1-1) are subjected to a hydrolysis-condensation reaction is appropriately in a range of 0° C. to 150° C. and preferably from 20° C. to 100° C. Further, the reaction may be carried out under any condition, that is, at atmospheric pressure, under increased or reduced pressure.

By-products which may develop in association with the hydrolysis-condensation reaction, that is, alcohols and water, may be removed by distillation, where they may deteriorate the stability of the obtained ultraviolet-curable resin composition or others.

The composite resin (A) used in the present invention is preferably that having a hydrophilic group. The resin has a hydrophilic group, by which it can be dissolved or dispersed into an aqueous medium to give an ultraviolet-curable aqueous resin composition which contains a composite resin having a hydrophilic group as the composite resin (A) and a photo initiator. Further, the ultraviolet-curable aqueous resin composition is used to prepare an aqueous coating.

The hydrophilic group preferably includes an anionic, cationic and nonionic groups. An anionic group is in particular preferable.

The above-described anionic group preferably includes, for example, a basic compound-neutralized carboxyl group, a basic compound-neutralized phosphate group, a basic compound-neutralized acid phospho ester group, a basic compound-neutralized phosphorous acid group, a basic compound-neutralized sulfonic group, a basic compound-neutralized sulfinic acid group, a basic compound-neutralized carboxylic acid anhydride. The basic compound-neutralized carboxyl group is in particular preferable because of easy introduction into the composite resin (A).

Basic compounds used in the above neutralization include, for example, organic amines such as methylamine, dimethyl amine, trimethylamine, ethylamine, diethylamine, triethylamine, 2-aminoethanol, 2-dimethyl aminoethanol; inorganic basic compounds such as ammonia, sodium hydroxide, and potassium hydroxide; tetramethyl ammonium hydroxide, tetra-n-butyl ammonium hydroxide, and quaternary ammonium hydroxide of trimethylbenzyl ammonium hydroxide. Organic amines and/or ammonia are in particular preferable.

The cationic group includes, for example, an acid compound-neutralized primary amino group, an acid compound-neutralized secondary amino group, an acid compound-neutralized tertiary amino group, and an acid compound-neutralized ammonium hydroxide. The acid compound-neutralized tertiary amino group is in particular preferable because of easy introduction into the composite resin (A).

Acid compounds used in the neutralization include, for example, carboxylic acids such as formic acid, acetic acid, propionic acid, and lactic acid; phosphoric acid monoesters or diesters such as phospho-monomethylester and phospho-dimethyl ester; organic sulfonic acids such as methane sulfonic acid, benzene sulfonic acid and dodecylbenzene sulfonic acid; and inorganic acids such as hydrochloric acid, sulfuric acid, and nitric acid. It is in particular preferable to use carboxylic acids.

The nonionic group includes, for example, a segment having a polyether skeleton. The segment having a polyether skeleton includes, for example, polyoxyalkylene chains such as polyoxyethylene chain, polyoxypropylene chain and polyoxybutylene chain; those in which the above-described oxyalkylene part such as poly(oxyethylene-oxypropylene) chain is copolymerized at random; and those in which mutually different polyoxyalkylene chains such as polyoxyethylene polyoxypropylene chains are bonded in a block form. Among other things, polyoxyalkylene chains are preferable, and polyoxyethylene chains are more preferable. Of the polyoxyethylene chains, preferable are those having an oxyethylene unit and/or an oxypropylene unit as an essential repeating unit.

The hydrophilic group is preferably present in a polymer segment (a2) constituting the composite resin (A) in view of favorably retaining the storage stability of a dispersion in which the composite resin (A) is dispersed in an aqueous medium and/or an aqueous solution in which the composite resin (A) is dissolved in the aqueous medium.

A hydrophilic group can be introduced into the composite resin (A), for example, by the following methods.

1. In the methods (1) through (3) for producing the composite resin (A), when an acryl-based polymer is prepared as a polymer segment (a2-1), an acid radical-containing acryl-based monomer is used together with a silanol group and/or a hydrolytic silyl group-containing acryl-based monomer to polymerize an acid radical-containing acryl-based polymer, the acid radical-containing acryl-based polymer is used to prepare the composite resin (A), and, thereafter, a basic compound is used to neutralize the composite resin.

2. In the methods (1) through (3) for producing the composite resin (A), when an acryl-based polymer is prepared as a polymer segment (a2-1), a base-containing acryl-based monomer is used together with a silanol group and/or a hydrolytic silyl group-containing acryl-based monomer to polymerize a base-containing acryl-based polymer, the base-containing acryl-based polymer is used to prepare the composite resin (A), and, thereafter, an acid compound is used to neutralize the composite resin.

Acryl-based monomers which contain the acid radical include, for example, a carboxyl group-containing vinyl-based monomer and a carboxylic acid anhydrous group-containing vinyl-based monomer. The carboxyl group-containing vinyl-based monomer includes, for example, unsaturated carboxylic acids such as (meta)acryl acid, 2-carboxyethyl (meta)acrylate, crotonic acid, itaconic acid, maleic acid and fumaric acid; various types of monoesters (half esters) of saturated monovalent alcohols with saturated dicarboxylic acids such as monomethyl itaconate, mono-n-butyl itaconate, monomethyl maleate, mono-n-butyl maleate, monomethyl fumarate, and mono-n-butyl fumarate; monovinyl esters of saturated dicarboxylic acids such as monovinyl adipate and monovinyl succinate; addition reaction products of vinyl-based monomers containing a hydroxyl group bonded to the carbon atoms, and anhydrides of saturated poly carboxylic acids such as anhydrous succinic acid, anhyrous glutaric acid, anhydrous phthalic acid, anhydrous trimellitic acid; and various types of monomers obtained by subjecting the carboxyl group-containing monomers and lactones to addition reaction. Further, the carboxyl group may be blocked. Vinyl-based monomers having a blocked carboxyl group include, for example, silylester group-containing vinyl-based monomers such as trimethylsilyl(meta)acrylate, dimethyl tert-butylsilyl(meta)acrylate and trimethylsilyl crotonate; hemiacetal ester group- or hemiketal ester group-containing monomers such as
1-ethoxy ethyl(meta)acrylate, 2-methoxy-2-(meta)acryloyl oxypropane, and 2-(meta)acryloyl oxytetrahydrofuran; and tert-butylester group-containing monomers such as tert-butyl(metha)acrylate and tert-butyl crotonate.

The carboxylic acid anhydrous group-containing vinyl-based monomers include, for example, anhydrides of unsaturated polycarboxylic acids such as anhydrous maleic acid, anhydrous itaconic acid; anhydrides of unsaturated monocarboxylic acids such as anhydrous acryl acid and anhydrous methcrylic acid; mixed acid anhydrides of unsaturated carboxylic acids such as acryl acid and methcrylic acid, and saturated carboxylic acids such as acetic acid, propionic acid and benzoic acid.

Acryl-based monomers containing the above-described base include, for example, vinyl-based monomers having a tertiary amino group. Vinyl-based monomers having the tertiary amino group include, for example, tertiary amino group-containing (meta)acrylic esters such as 2-dimethyl amino ethyl(meta)acrylate, 2-diethylaminoethyl(meta)acrylate, 2-di-n-propylaminoethyl(meta)acrylate, 3-dimethyl aminopropyl(meta)acrylate, 4-dimethyl aminobutyl(meta)acrylate, N-[2-(meta)acryloyl oxy]ethylmorpholine; tertiary amino group-containing aromatic vinyl-based monomers such as vinyl pyridine, N-vinyl carbazole, N-vinyl quinoline; tertiary amino group-containing (meta)acryl amides such as N-(2-dimethyl amino)ethyl(meta)acryl amide, N-(2-diethylamino) ethyl(meta)acryl amide, N-(2-di-n-propylamino)ethyl(meta) acryl amide; tertiary amino group-containing crotonic acid amides such as N-(2-dimethyl amino)ethyl crotonic acid amide, N-(4-dimethyl amino)butyl crotonic acid amide; and tertiary amino group-containing vinyl ethers such as 2-dimethylaminoethylvinyl ether, 2-diethylaminoethylvinyl ether, 4-dimethylaminobutylvinyl ether.

The hydrophilic group-containing composite resin (A) may contain any one of the hydrophilic groups such as an anionic, cationic and nonionic group, or may be used in combination of a nonionic group with an anionic group or a cationic group. It is to be noted that an anionic group and a cationic group may be used together to such an extent not to decrease the storage stability of a dispersion in which the composite resin (A) is dispersed into an aqueous medium and/or an aqueous solution in which the composite resin (A) is dissolved into the aqueous medium.

The hydrophilic group is preferably present in a range of 0.1 to 20% by weight with respect to a whole quantity of the composite resin (A) in view of favorably retaining the storage stability of a dispersion in which the composite resin (A) is dispersed in an aqueous medium and/or an aqueous solution in which the composite resin (A) is dissolved in the aqueous medium.

The photo initiator (B) of the present invention includes, for example, one or more types selected from the group consisting of acetophenones, benzylketals and benzophenones. The acetophenones include diethoxy acetophenone, 2-hydroxy-2-methyl-1-phenylpropane-1-on, 1-(4-isopropylphenyl)-2-hydroxy-2-methylpropane-1-on, 4-(2-hydroxyethoxy)phenyl-(2-hydroxy-2-propyl)ketone. The benzylketals include, for example, 1-hydroxycyclohexylphenyl ketone and benzyldimethyl ketal. The benzophenones include, for example, benzophenone, o-benzoyl methyl benzoate. The benzoins include, for example, benzoin, benzoin methylether and benzoin isopropylether. A photo initiator (B) may be used solely or in combination of two or more of them.

The photo initiator (B) is used preferably in a range of 1 to 15 parts by weight with respect to 100 parts by weight of the composite resin (A), and more preferably from 2 to 10 parts by weight.

It is preferable that an ultraviolet-curable resin composition of the present invention contains, whenever necessary, a polyfunctional (meta)acrylate and a thermosetting resin. The polyfunctional acrylate includes, for example, a polyfunctional (meta)acrylate having two or more polymerizable double bonds in one molecule such as 1, 2-ethane diol diacrylate, 1,2-propane diol diacrylate, 1,4-butane diol diacrylate, 1,6-hexane diol diacrylate, dipropylene glycol diacrylate, neopentyl glycol diacrylate, tripropylene glycol diacrylate, trimethylol propane triacrylate, tris(2-acryloyl oxy)isocyanurate, pantaarythritol tri-acrylate, pentaerythritol tetra-acrylate, di(trimethylol propane)tetra-acrylate, di(pentaerythritol)pentaacrylate, or di(pentaerythritol)hexa-acrylate. Further, urethane acrylate, polyester acrylate and epoxy acrylate may be also exemplified as a polyfunctional acrylate. They may be used solely or in combination of two or more types of them.

The polyfunctional acrylate (C) is used preferably in a quantity of 1 to 200 parts by weight with respect to 100 parts by weight of the composite resin (A) and more preferably from 20 to 100 parts by weight. The polyfunctional acrylate is used in the above-described range, thereby making it possible to improve physical properties of the obtained coating film such as hardness.

Further, an ultraviolet-curable resin composition of the present invention may be used not only with an ultraviolet-curable resin other than the composite resin (A) but also with a thermosetting resin. The thermosetting resin includes, a vinyl-based resin, an unsaturated polyester resin, a polyurethane resin, an epoxy resin, an epoxy ester resin, an acryl resin, a phenol resin, a petroleum resin, a ketone resin, a silicone resin and their modified resins.

The composite resin (A) used in the present invention contains a polysiloxane segment (a1) having an ultraviolet-curable polymerizable double bond. For this reason, this composite resin is relatively compatible either with a silicone resin capable of improving the surface lubricity of a coating film or with an ultraviolet-curable resin having a polymerizable double bond. Therefore, the composite resin (A) used in the present invention is also able to improve the compatibility of the silicone resin with an ultraviolet-curable resin.

Further, an ultraviolet-curable resin composition of the present invention may contain, whenever necessary, various additives such as organic solvent, inorganic pigment, organic pigment, extender pigment, clay mineral, wax, surface active agent, stabilizer, fluidity adjusting agent, dye, leveling agent, rheology controlling agent, ultraviolet ray absorbing agent, anti-oxidant, or plasticizer.

As the organic solvent, for example, aliphatic- or cyclic aliphatic-based hydrocarbons such as n-hexane, n-heptane, n-octane, cyclohexane and cyclopentane; aromatic hydrocarbons such as toluene, xylene and ethyl benzene; alcohols such as methanol, ethanol, n-butanol, ethylene glycol monomethylether, propylene glycol monomethylether; esters such as ethyl acetate, butyl acetate, n-butyl acetate, n-amyl acetate, ethylene glycol monomethylether acetate, propylene glycol monomethylether acetate; ketones such as acetone, methylethyl ketone, methylisobutyl ketone, methyl n-amylketone, and cyclohexane; polyalkylene glycol dialkyl ethers such as diethylene glycol dimethyl ether, and diethylene glycol dibutylether; ethers such as 1,2-dimethoxy ethane, tetrahydrofuran, and dioxane; N-methylpyrolidone, dimethyl formamide, dimethyl acetoamide and ethylenecarbonate may be used solely or in combination of two or more.

Further, an ultraviolet-curable aqueous resin composition of the present invention is used together with a curing agent, whenever necessary, by which a curing system other than ultraviolet ray curing systems may be used together. In other words, a cured coating obtained through ultraviolet ray radiation is further heated or allowed to stand in the atmosphere, thereby facilitating thermal cure reactions and curing, and making it possible to improve the solvent resistance, acid resistance and hardness of the obtained coating. A curing agent usable in this instance preferably has a functional group which can react with a hydrophilic group where the composite resin (A) contains the hydrophilic group. Where the hydrophilic group remains on formation of a cured coating by an aqueous ultraviolet-curable resin composition of the present invention, there are concerns that the water resistance and solvent resistance of the cured coating may be decreased, therefore, it may be unfavorable according to the application. Therefore, a curing agent having a functional group which can react with the hydrophilic group is used, by which the hydrophilic group remaining in a cured coating is decreased in quantity, thus making it possible to prevent decreased water resistance or the like.

The above-described curing agent includes a curing agent having, for example, an isocyanate group, a blocked isocyanate group, an epoxy group, an oxazoline group, a carbodiimide group, a hydrazino group, a silicon atom-bonded hydroxyl group, a silicon atom-bonded hydrolytic group, a N-hydroxymethylamino group, and a N-alkoxy methylamino group.

The functional group contained in the curing agent may be appropriately selected depending on the types of functional groups contained in the composite resin (A). For example, where the composite resin (A) is a composite resin which has a carboxyl group or a neutralized carboxyl group is given as a hydrophilic group, it is preferable that an epoxy group-containing compound and a polyoxazoline compound are used as the curing agent. Where the composite resin (A) has a hydroxyl group as the hydrophilic group, it is preferable that an isocyanate group-containing compound or an amino resin is used as the curing agent.

The curing agent may include, for example, a compound having a silanol group and/or a hydrolytic silyl group, a compound having an epoxy group and a hydrolytic silyl group at the same time in one molecule, a polyisocyanate compound, a block polyisocyanate compound, a polyepoxy compound, a polyoxazoline compound, an amino resin and a polyfunctional hydrazide compound. They may be used solely or in combination of two or more of them.

Compounds having the silanol group and/or the hydrolytic silyl group include, for example, a silane compound similar to that exemplified as that usable in producing the composite resin (A); a partial hydrolysis condensate of the silane compound; a partial hydrolysis condensate obtained by subjecting a mixture of two or more of the silane compounds to a partial hydrolysis-condensation reaction.

The above-described compounds having an epoxy group and a hydrolytic silyl group in one molecule include, for example, 3-glycidoxy propyltrimethoxy silane, 3-glycidoxy propylmethyldimethoxy silane, 3-glycidoxy propyltriethoxy silane, 3-glycidoxy propylmethyldiethoxy silane, β-(3,4-epoxycyclohexyl)ethyltrimethoxy silane, a partial hydrolysis condensate obtained by subjecting the silane compound to a partial hydrolysis-condensation, a partial hydrolysis condensate obtained by subjecting two or more of the silane compounds to a partial hydrolysis-condensation, and vinyl-based copolymers having an epoxy group and a hydrolytic silyl group at the same time.

The polyisocyanate includes, for example, aromatic diisocyanates such as tolylene diisocyanate, diphenyl methane-4,4'-diisocyanate; aralkyl diisocyanates such as meta-xylene diisocyanate, $\alpha,\alpha,\alpha',\alpha'$-tetramethyl methaxylylene diisocyanate; aliphatic or cycloaliphatic diisocyanates such as hexamethylene diisocyanate, lysine diisocyanate, 1,3-bisisocyanate methylcyclohexane, 2-methyl 1,3-diisocyanate cyclohexane, 2-methyl 1,5-diisocyanate cyclohexane and isoboron diisocyanate.

Also usable are various types of prepolymers having an isocyanate group obtained by subjecting the polyisocyanate and a polyvalent alcohol to addition reaction; prepolymers having an isocyanurate ring obtained by subjecting the polyisocyanate to cyclo-trimerization; and vinyl-based copolymers containing an isocyanate group which is obtained from vinyl-based monomers which contain as an essential composition a vinyl monomer having an isocyanate group such as polyisocyanate having a biuret structure, 2-isocyanate ethyl (meta)acrylate, 3-isopropenyl-α, α-dimethyl benzyl isocyanate or (meta)acryloyl isocyanate, which is obtained by allowing the polyisocyanate and water to react.

It is to be noted that the above-described polyisocyanate includes a so-called block polyisocyanate compound which is blocked by various types of blocking agents.

The blocking agents include, for example, alcohols such as methanol, ethanol and lactate ester; phenol hydroxyl group-containing compounds such as phenol and ester salicylate; amides such as ε-caprolactanm and 2-pyrolidone; oximes such as acetone oxime and methylethylketo oxime; active methylene compounds such as methyl acetoacetate, ethyl acetoacetate and acetyl acetone.

The polyepoxy compounds include, for example, polyglycidyl ethers of aliphatic or cycloaliphatic polyols such as ethylene glycol, hexane diol, neopentyl glycol, trimethylol propane, pentaerythritol, sorbitol, and hydrogenated bisphenol A; polyglycidyl ethers of aromatic-based diols such as bisphenol A, bisphenol S and bisphenol F; polyglycidyl ethers of polyether polyols such as polyethylene glycol, polypropylene glycol, and polytetramethylene glycol; polyglycidyl ethers of tris(2-hydroxyethyl)isocyanurate; polyglycidyl esters of aliphatic or aromatic poly carboxylic acids such as adipic acid, butane tetra carboxylic acid, phthalic acid and terephthalic acid; bisepoxides of hydrocarbon-based dienes such as cycloocta diene and vinyl cyclohexane; cycloaliphatic polyepoxy compounds such as bis(3,4-epoxy cyclohexylmethyl)adipate, 3,4-epoxy cyclohexylmethyl 3,4-epoxy cyclohexyl carboxylate; and vinyl-based copolymers containing two or more epoxy groups.

The polyoxazoline compounds include, for example, low-molecular weight poly (1.3-oxazoline) compounds such as 2,2'-p-phenylene-bis-(1,3-oxazoline), 2,2'-tetramethylene bis-(1,3-oxazoline), 2,2'-octamethylene bis-(2-oxazoline); and vinyl-based polymers containing a 1,3-oxazoline group obtained by copolymerizing a single polymer of a vinyl-based monomer containing a 1,3-oxazoline group such as 2-isopropenyl-1,3-oxazoline with a vinyl-based monomer which can copolymerize therewith.

The amino resin includes, for example, various types of alkyrol group-containing amino resins obtained by allowing an amino group-containing compound such as melamine, benzoguanamine, acetoguanamine, urea or glycouril to react with an aldehyde compound such as formaldehyde or acetoaldehyde (or aldehyde feed material). Also, usable are alkoxyalkyl group-containing amino resins obtained by allowing an amino resin having the alkyrol group to react with a lower alcohol such as methanol, ethanol, n-butanol or iso-butanol.

The polyfunctional hydrazide compounds include, for example, dihydrazide compounds of organic acids such as dihydrazide oxalate, dihydrazide malonate and dihydrazide succinate.

Where the ultraviolet-curable resin composition of the present invention is used in an aqueous system, it is preferable to use the above-described curing agent which is hydrophilic to such an extent that is soluble or dispersible in an aqueous medium, because an aqueous ultraviolet-curable resin composition in which the curing agent is uniformly dispersed or dissolved can be obtained. However, even in a case where the curing agent is not sufficiently hydrophilic as described above, it is possible to obtain an ultraviolet-curable aqueous resin composition in which the curing agent is uniformly dispersed or dissolved by a method for dispersing forcibly the agent into the ultraviolet-curable resin composition of the present invention through a mechanical emulsification or a method for dissolving or dispersing a pre-mixture of the composite resin (C) with the curing agent into an aqueous medium.

Where the above-described curing agent is used in an ultraviolet-curable aqueous resin composition of the present invention and the curing agent is a compound having a silanol group and/or a hydrolytic silyl group, the curing agent is preferably used so as to be in a range of 0.1 to 200 parts by weight on a dry solid basis with respect to 100 parts by weight of the composite resin (A), more preferably in a range of 0.5 to 150 parts by weight and in particular preferably in a range of 1 to 100 parts by weight.

Further, where the curing agent is a compound having an epoxy group and a hydrolytic silyl group at the same time in one molecule or a polyepoxy compound, the curing agent is preferably used in such a way that a quantity of an epoxy group contained in the curing agent is in a range of 0.2 to 5.0 equivalent with respect to one equivalent of a functional group reacting with the epoxy group contained in the composite resin (A), more preferably in a range of 0.5 to 3.0 equivalent and in particular preferably in a range of 0.7 to 2.0 equivalent.

Still further, where the curing agent is the polyisocyanate or the block polyisocyanate, the curing agent is preferably used in such a way that a quantity of an isocyanate group or a block isocyanate group contained in the curing agent is in a range of 0.1 to 10 equivalent with respect to one equivalent of a functional group reacting with the isocyanate group or the block isocyanate group contained in the composite resin (A), more preferably in a range of 0.3 to 5.0 equivalent, and in particular preferably in a range of 0.5 to 2.0 equivalent.

Where the curing agent is an amino resin, the curing agent is preferably used in such a way that a quantity of the amino resin is in a range of 0.1 to 200 parts by weight on a dry solid basis with respect to 100 parts by weight of the composite resin (A), more preferably in a range of 0.5 to 150 parts by weight, and in particular preferably in a range of 1 to 100 parts by weight.

Where the curing agent is a polyoxazoline compound, the curing agent is preferably used in such a way that a quantity of an oxazoline group contained in the curing agent is in a range of 0.2 to 5.0 equivalent with respect to one equivalent of a functional group reacting with the oxazoline group contained in the composite resin (A), more preferably in a range of 0.5 to 3.0 equivalent, and in particular preferably in a range of 0.7 to 2.0 equivalent.

Further, where the curing agent is a polyfunctional hydrazide compound, the curing agent is preferably used in such a way that a quantity of a hydrazino group contained in the curing agent is in a range of 0.2 to 5.0 equivalent with respect to one equivalent of a functional group reacting with a hydrazino group contained in the composite resin (A), more preferably in a range of 0.5 to 3.0 equivalent, and in particular preferably in a range of 0.7 to 2.0 equivalent.

The curing agent is used in the above range, thereby making it possible to improve physical properties of the obtained coating film such as solvent resistance and hardness.

An ultraviolet-curable resin composition of the present invention can be used in various forms. More specifically, it can be used as a solution dissolved in an organic solvent, a dispersion dispersed in an organic solvent, a solution dissolved in water, a dispersion dissolved in water and a solution in which no solvent or water is used and a powder form.

An ultraviolet-curable resin composition of the present invention can be used as an ultraviolet-curable coating, as it is. It also can be converted into an ultraviolet-curable coating after addition of additives such as the above-described organic and inorganic pigments.

Ultraviolet rays which can cure the ultraviolet-curable resin composition and the ultraviolet-curable coating of the present invention can be generated, for example, by a low-pressure mercury lamp, a high-pressure mercury lamp, a metal halide lamp, a xenon lamp, argon laser, or helium/cadmium laser. Ultraviolet rays with a wavelength of about 180 to 400 nm generated therefrom are radiated to the surface on which an ultraviolet-curable resin composition is coated, thereby making it possible to cure the coating film.

The irradiated level of the ultraviolet rays can be selected appropriately depending on a type or a quantity of the photo initiator (B) to be used.

There is no particular restriction on the thickness of a coating film formed by using the ultraviolet-curable resin composition and the ultraviolet-curable coating of the present invention. The thickness is preferably from 0.1 to 100 μm and more preferably from 1 to 50 μm in view of preventing cracks that may develop on a cured coating film and providing a cured coating film excellent in durability.

An ultraviolet-curable resin composition and an ultraviolet-curable coating of the present invention are coated on a base material and ultraviolet rays are radiated thereon, by which a coated article having a cured coating film excellent in durability can be obtained.

Various substances may be used as the base material, including, for example, a metal base material, an inorganic base material, a plastic base material, a paper-based and a wood-based base material.

The metal base material includes, for example, various metals such as iron, nickel, aluminum, copper and lead, alloys of various metals such as stainless steel, and those which are surface-treated by plating or chemical treatment.

The inorganic base materials include, for example, those substantially made of inorganic materials such as cement, silicate such as calcium silicate, gypsum, and ceramics. Base materials (wet-type) for site operation include, for example, bare concrete, cement mortar, gypsum plaster, dolomite plaster, and lime plaster. Base materials (dry-type) for site operation include, for example, autoclaved lightweight concrete (ALC), asbestos cement, glass fiber-reinforced calcium silicate, gypsum board, calcinated clay such as tiles, and glass.

The plastic base materials include, for example, polyolefins such as polyethylene, polypropylene and ethylenepropylene copolymer; polyesters such as polyethylene isophthalate, polyethylene terephthalate, polyethylene naphthalate and polybutylene terephthalate; polyamides such as nylon 1, nylon 11, nylon 6, nylon 66 and nylon MX-D; styrene-based polymers such as polystyrene, styrene-butadiene block copolymer, styrene-acrylonitrile copolymer, styrene butadiene-acrylonitrile copolymer (ABS resin); acryl-based polymers such as polymethyl methacrylate, and methyl methacrylate-ethylacrylate copolymer; and polycarbonates. The plastic base material may be available in a laminated structure made up of one or two or more layers. Further, the plastic base material may be subjected to non-stretching, monoaxial stretching or biaxial stretching Further, the plastic base material may contain, whenever necessary, known additives such as antistatic agents, anti-fogging agents, anti-blocking agents, anti-oxidants, light stabilizers, crystalline nucleus agents, and lubricants, as long as they will not influence the effect of the present invention.

The plastic base material may be surface-treated for further improving the adhesion to an ultraviolet-curable resin composition of the present invention. Such surface treatment includes, for example, corona discharge, plasma treatment, flame plasma treatment, electron beam radiation, and ultraviolet ray radiation. These treatments may be used in combination of one or two or more of them.

There is no particular restriction on forms of the base material. In other words, the base material may be available, for example, in a sheet form, a plate form, a spherical form and a film form. It may be also available in large constructions and fabricated or shaped articles with a complicated configuration.

The surface of the base material may be coated in advance with a primer or the like. Further, where the coated part is deteriorated, it is possible to coat an ultraviolet-curable resin composition of the present invention.

The primer includes a water-soluble or a water-dispersion coating, an organic solvent- or an organic solvent-dispersion coating, and a powdery coating. More specifically, usable are various types of coating media such as an acryl resin-based coating, a polyester resin-based coating, an alkyd resin-based coating, an epoxy resin-based coating, a fatty acid-modified epoxy resin-based coating, a silicone resin-based coating, a polyurethane resin-based coating, a fluoroolefin-based coating, and an amine-modified epoxy resin coating.

Further, the primer may be a clear coating free of a pigment. It may be an enamel-based coating containing the pigment or a metallic coating containing aluminum flakes and others.

An ultraviolet-curable resin composition or an ultraviolet-curable coating of the present invention can be coated on the base material, for example, by known conventional methods such as brushing, roller coating, spray coating, immersion coating, flow coater coating, roller coater coating, and electro-coating.

An ultraviolet-curable resin composition of the present invention is coated on the surface of the base material by the above method, thereafter, ultraviolet rays are radiated on the coated surface by the previously described method, thereby making it possible to provide a coated article having a coating film excellent in solvent resistance, acid resistance and alkali resistance.

Coated articles obtained by using an ultraviolet-curable resin composition of the present invention include, for example, transportation-related machinery such as automobiles, motorcycles, trains, bicycles, ships, aircraft, and various types of components used therein; electric appliances such as television sets, radios, refrigerators, washing machines, air conditioner coolers, air-conditioner outdoor units, computers and various types of components used therein; construction materials such as inorganic-based bricks, metal roof materials, inorganic-based outer wall materials, metal wall materials, metal window frames, metal or wooden doors and inner wall materials; outdoor construction materials such as roads, traffic signs, crash barriers, bridges, storage tanks, chimneys, and buildings; wrapping materials such as various types of coated films composed of polyester resin film, acryl resin film, and fluororesin film; containers such as plastic bottles and metal cans; others such as musical instruments, office supplies, sports gear and toys made with the base material.

The ultraviolet-curable resin composition and the ultraviolet-curable coating of the present invention are able to form a cured coating film in particular excellent in solvent resistance, excellent in acid resistance and alkali resistance, and excellent in hardness. Therefore, they can be used mainly in finishing coating media for automobiles, coating media for construction exteriors and coating media for construction materials. They also can be used in various applications such as photocatalysis coating agents, adhesive agents, inks, gas barrier coating agents, impregnants of fiber or paper, and surface treatment agents.

EMBODIMENTS

Next, a description will be made specifically for the present invention by referring to embodiments and comparative examples. Unless otherwise specified, parts and percentages are based on weight.

Synthesis Example 1

Preparation Example of Composite Resin (A)

Phenyltrimethoxy silane (PTMS) of 191 g was fed into a reaction vessel equipped with a stirrer, thermometer, dropping funnel, cooling tube and nitrogen gas feeding port, and the reaction vessel was heated up to 120° C. Next, a mixture composed of methylmethacrylate (MMA) of 169 g, 3-methacryloyl oxypropyltrimethoxy silane (MPTS) of 11 g and tert-butyl paroxy-2-ethylhexanoate (TBPEH) of 18 g, was added dropwise into the reaction vessel for four hours. Thereafter, the resultant was stirred for 16 hours at the same temperature to prepare a vinyl polymer (a2-1-1) having a trimethoxy silyl group.

Next, the reaction vessel was adjusted to a temperature of 80° C., and methyltrimethoxy silane (MTMS) of 131 g, 3-acryloyl oxypropyltrimethoxy silane (APTS) of 226 g, and dimethyldimethoxy silane (DMDMS) of 116 g were added into the reaction vessel. Thereafter, a mixture of "A-3" of 6.3 g (iso-propyl acid phosphate made by Sakai Chemical Industry Co., Ltd.,) and deionized water of 97 g was added dropwise for five minutes and stirred for two hours at the same temperature, by which hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-1) were hydrolyzed. Thereafter, the reaction product was distilled for two hours under reduced pressure of 10 to 300 mmHg at temperatures of 40° C. to 60° C., by which the produced methanol and water were removed to obtain a composite resin (A1) of 600 g with a non-volatile content of 99.4% composed of a polysiloxane segment (a1) and a vinyl polymer segment (a2).

Synthesis Example 2 (The Same as Above)

PTMS of 191 g was fed into a reaction vessel similar to that used in Synthesis example 1, which was heated up to 120° C. Next, a mixture of MMA of 175 g, MPTS of 5 g and TBPEH of 5.4 g was added dropwise into the reaction vessel for four hours. Thereafter, the resultant was stirred at the same temperature for 16 hours to prepare a vinyl polymer (a2-1-2) having a trimethoxy silyl group.

Next, the reaction vessel was adjusted to a temperature of 80° C., and MTMS of 131 g, APTS of 226 g, and DMDMS of 116 g were added into the reaction vessel. Thereafter, a mixture of "A-3" of 6.3 g and deionized water of 97 g was added dropwise for five minutes and stirred for two hours at the same temperature, by which the hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-2) were hydrolyzed. Thereafter, the reaction product was distilled for two hours under reduced pressure of 10 to 300 mmHg at temperatures of 40° C. to 60° C., by which the produced methanol and water were removed. Next, butyl acetate (BuAc) of 400 g was added to obtain a composite resin (A2) of 600 g with a non-volatile content of 99.6% composed of a polysiloxane segment (a1) and a vinyl polymer segment (a2).

Synthesis Example 3 (The Same as Above)

PTMS of 264 g was fed into a reaction vessel similar to that used in Synthesis example 1, which was heated up to 120° C. Next, a mixture of MMA of 169 g, MPTS of 11 g and TBPEH of 18 g was added dropwise into the reaction vessel for four hours. Thereafter, the resultant was stirred for 16 hours at the same temperature to prepare a vinyl polymer (a2-1-3) having a trimethoxy silyl group.

Next, the reaction vessel was adjusted to a temperature of 80° C., and MTMS of 181 g and APTS of 226 g were added into the reaction vessel. Thereafter, a mixture of "A-3" of 6.0 g and deionized water of 100 g was added dropwise for five minutes and stirred for two hours at the same temperature, by which the hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-3) were hydrolyzed. Thereafter, the reaction product was distilled for two hours under reduced pressure of 10 to 300 mmHg at temperatures of 40° C. to 60° C., by which the produced methanol and water were removed. Next, BuAc of 400 g was added to obtain a composite resin (A3) of 1000 g with a non-volatile content of 60.3% by mass composed of a polysiloxane segment (a1) and a vinyl polymer segment (a2).

Synthesis Example 4 (The Same as Above)

PTMS of 250 g was fed into a reaction vessel similar to that used in Synthesis example 1, which was heated up to 120° C. Next, a mixture of MMA of 169 g, MPTS of 11 g and TBPEH of 18 g was added dropwise into the reaction vessel for four hours. Thereafter, the resultant was stirred for 16 hours at the same temperature to prepare a vinyl polymer (a2-1-4) having a trimethoxy silyl group.

Next, the reaction vessel was adjusted to a temperature of 80° C., and MTMS of 172 g, APTS of 113 g and DMDMS of 151 g were added into the reaction vessel. Thereafter, a mixture of "A-3" of 6.9 g and deionized water of 105 g was added dropwise for five minutes and stirred for two hours at the same temperature, by which the hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-4) were hydrolyzed. Thereafter, the reaction product was distilled for two hours under reduced pressure of 10 to 300 mmHg at temperatures of 40° C. to 60° C., by which the produced methanol and water were removed. Next, BuAc of 400 g was added to obtain a composite resin (A4) of 1000 g with a non-volatile content of 60.0% by mass composed of a polysiloxane segment (a1) and a vinyl polymer segment (a2).

Synthesis Example 5 (The Same as Above)

PTMS of 191 g was fed into a reaction vessel similar to that used in Synthesis example 1, which was heated up to 120° C. Next, a mixture of MMA of 169 g, MPTS of 11 g and TBPEH of 18 g was added dropwise into the reaction vessel for four hours. Thereafter, the resultant was stirred at the same temperature for 16 hours to prepare a vinyl polymer (a2-1-5) having a trimethoxy silyl group.

Next, the reaction vessel was adjusted to a temperature of 80° C., and MTMS of 131 g, MPTS of 221 g and DMDMS of 116 g were added into the reaction vessel. Thereafter, a mixture of "A-3" of 6.3 g and deionized water of 97 g was added dropwise for five minutes and stirred for two hours at the same temperature, by which hydrolysis-condensation reaction was allowed to proceed to obtain a reaction product. The reaction product was subjected to $^1$H-NMR analysis to find that almost 100% of the trimethoxy silyl groups contained in the vinyl polymer (a2-1-5) were hydrolyzed. Thereafter, the reaction product was distilled for two hours under reduced pressure of 10 to 300 mmHg at temperatures of 40° C. to 60° C., by which the produced methanol and water were removed. Next, BuAc of 416 g was added to obtain a composite resin (A5) of 1000 g with a non-volatile content of 59.6% composed of a polysiloxane segment (a1) and a vinyl polymer segment (a2).

Synthesis Example 6 (The Same as Above)

PTMS of 218 g was fed into a reaction vessel similar to that used in Synthesis example 1, which was heated up to 120° C. Next, a mixture of MMA of 113 g, MPTS of 7 g and TBPEH of 12 g was added dropwise into the reaction vessel for four hours. Thereafter, the resultant was stirred for 16 hours at the same temperature to prepare a vinyl polymer (a2-1-6) having a trimethoxy silyl group.

Next, the reaction vessel was adjusted to a temperature of 80° C., and MTMS of 150 g, APTS of 258 g and DMDMS of 132 g were added into the reaction vessel. Thereafter, a mixture of "A-3" of 7.2 g and deionized water of 111 g was added dropwise for five minutes and stirred for two hours at the same temperature, by which hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-6) were hydrolyzed. Thereafter, the reaction product was distilled for two hours under reduced pressure of 10 to 300 mmHg at temperatures of 40° C. to 60° C., by which the produced methanol and water were removed. Next, BuAc of 400 g was added to obtain a composite resin (A6) of 1000 g with a non-volatile content of 60.1% by mass composed of a polysiloxane segment (a1) and a vinyl polymer segment (a2).

Synthesis Example 7 (The Same as Above)

PTMS of 164 g was fed into a reaction vessel similar to that used in Synthesis example 1, which was heated up to 120° C. Next, a mixture of MMA of 226 g, MPTS of 14 g and TBPEH of 24 g was added dropwise into the reaction vessel for four hours. Thereafter, the resultant was stirred for 16 hours at the same temperature to prepare a vinyl polymer (a2-1-7) having a trimethoxy silyl group.

Next, the reaction vessel was adjusted to a temperature of 80° C., and MTMS of 113 g, APTS of 194 g and DMDMS of 99 g were added into the reaction vessel. Thereafter, a mixture of "A-3" of 5.4 g and deionized water of 83 g was added dropwise for five minutes and stirred for two hours at the same temperature, by which the hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-7) were hydrolyzed. Thereafter, the reaction product was distilled for two hours under reduced pressure of 10 to 300 mmHg at temperatures of 40° C. to 60° C., by which the produced methanol and water were removed. Next, BuAc of 400 g was added to obtain a composite resin (A7) of 1000 g with a non-volatile content of 59.8% by mass composed of a polysiloxane segment (a1) and a vinyl polymer segment (a2).

Synthesis Example 8 (The Same as Above)

PTMS of 191 g was fed into a reaction vessel similar to that used in Synthesis example 1, which was heated up to 120° C. Next, a mixture of MMA of 121 g, acryl acid (AA) of 33 g, MPTS of 10 g and TBPEH of 16 g was added dropwise into the reaction vessel for four hours. Thereafter, the resultant was stirred for 20 hours at the same temperature. Next, 3-glycidyl methacrylate (GMA) of 16 g and 2-methyl imidazole (2-MIZ) of 0.8 g were added and stirred for two hours at the same temperature to prepare a vinyl polymer (a2-1-8) having a trimethoxy silyl group and methacryloyl.

Next, the reaction vessel was adjusted to a temperature of 80° C., and MTMS of 131 g, APTS of 226 g and DMDMS of 116 g were added into the reaction vessel. Thereafter, a mixture of "A-3" of 6.3 g and deionized water of 98 g was added dropwise for five minutes and stirred for two hours at the same temperature, by which the hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-8) were hydrolyzed. Thereafter, the reaction product was distilled for two hours under reduced pressure of 10 to 300 mmHg at temperatures of 40° C. to 60° C., by which the produced methanol and water were removed. Next, BuAc of 400 g was added to obtain a composite resin (A8) of 1000 g with a non-volatile content of 59.8% by mass composed of a polysiloxane segment (a1) and a vinyl polymer segment (a2).

Synthesis Example 9

Preparation of Polysiloxane

MTMS of 415 g and MPTS of 756 g were fed into a reaction vessel equipped with a stirrer, thermometer, dropping funnel, cooling tube and nitrogen gas feeding port, and the reaction vessel was heated up to 60° C. Next, a mixture of "A-3" of 0.1 g and deionized water of 121 g was added dropwise into the reaction vessel over five minutes. After completion of the addition, the reaction vessel was heated up to 80° C. and stirred for four hours, by which the hydrolysis-condensation reaction was allowed to proceed to obtain a reaction product. Ethanol and water contained in the thus obtained reaction product were removed under reduced pressure of 10 to 300 mmHg at temperatures of 40° C. to 60° C., thereby obtaining a polysiloxane (PS-1) of 1000 g with a number average molecular weight of 1000 and an active ingredient of 75.0%. It is to be noted that the "active ingredient" is a value calculated according to a formula in which a theoretical yield (parts by weight) for a case where used silane monomer methoxy groups are all subjected to the hydrolysis-condensation reaction is divided by an actual yield (parts by weight) after the hydrolysis-condensation reaction, that is, [an actual yield (parts by weight) after the theoretical yield (parts by weight)/condensation reaction for a case where silane monomer methoxy groups are all subjected to the hydrolysis-condensation reaction].

Synthesis Example 10 (The Same as Above)

MTMS of 440 g and APTS of 756 g were fed into a reaction vessel similar to that used in Synthesis example 1, which was heated up to 60° C. Next, a mixture of "A-3" of 0.1 g and deionized water of 128 g was added dropwise for five minutes. After completion of the dropping, the reaction vessel was heated up to 80° C. and the resultant was stirred for four hours, by which the hydrolysis-condensation reaction was allowed to proceed to obtain a reaction product. Ethanol and water contained in the thus obtained reaction product were removed under reduced pressure of 10 to 300 mmHg at 60°

C., thereby obtaining a polysiloxane (PS-2) of 1000 g with a number average molecular weight of 1000 and an active ingredient of 75.0%.

Synthesis Example 11 (The Same as Above)

MTMS of 1421 g was fed into a reaction vessel similar to that used in Synthesis example 1, which was heated up to 60° C. Next, a mixture of "A-3" of 0.17 g and deionized water of 207 g was added dropwise for five minutes. After completion of the dropping, the reaction vessel was heated up to 80° C. and the resultant was stirred for four hours, by which the hydrolysis-condensation reaction was allowed to proceed to obtain a reaction product. Ethanol and water contained in the thus obtained reaction product were removed under reduced pressure of 10 to 300 mmHg at temperatures of 40 to 60° C., thereby obtaining a polysiloxane (PS-3) of 1000 g with a number average molecular weight of 1000 and an active ingredient of 70.0% in the reaction solution.

Synthesis Example 12

Preparation of Composite Resin (A)

Propyleneglycol monopropylether (PnP) of 80 g, isopropyl alcohol (IPA) of 36 g, PTMS of 54 g and DMDMS of 33 g were fed into a reaction vessel similar to that used in Synthesis example 1, which was heated up to 80° C. Next, a mixture of MMA of 113 g, butylmethacrylate (BMA) of 92 g, butylacrylate (BA) of 52 g, AA of 16 g, MPTS of 8 g, IPA of 14 g, and TBPEH of 14 g was added dropwise into the reaction vessel for four hours to allow for polymerization reaction to proceed. Two hours later after completion of the adding, a mixture of "A-3" of 0.9 g and deionized water of 24 g was added dropwise for five minutes, and the resultant was thereafter stirred for 16 hours at the same temperature to allow for the hydrolysis-condensation reaction.

Next, triethylamine (TEA) of 18 g and polysiloxane (PS-1) of 87 g were added into the reaction vessel, and deionized water of 550 g was then added thereto. Thereafter, "BYK-020" of 0.4 mass parts [polysiloxane-based anti-foaming agent manufactured by Big Chemy Japan Co., Ltd., was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A9) of 1000 g with a non-volatile content of 40.0% composed of a polysiloxane segment (a1) and a vinyl polymer segment (a2).

Synthesis Example 13 (The Same as Above)

PnP of 65 g, IPA of 29 g, PTMS of 44 g, and DMDMS of 26 g were fed into a reaction vessel similar to that used in Synthesis example 1, which was heated up to 80° C. Next, a mixture of MMA of 92 g, BMA of 64 g, BA of 43 g, AA of 25 g, MPTS of 7 g, IPA of 11 g, and TBPEH of 11 g was added into the reaction vessel for four hours to allow for polymerization reaction. Two hours later after completion of the addition, a mixture of "A-3" of 0.6 g and deionized water of 16 g was added dropwise for five minutes, and the resultant was thereafter stirred for 16 hours at the same temperature to allow for the hydrolysis-condensation reaction.

Next, GMA of 23 g, TEA of 18 g and polysiloxane (PS-1) of 76 g were added into the reaction vessel, and deionized water of 593 g was then added thereto. Thereafter, "BYK-020" of 0.3 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A10) of 1000 g with a non-volatile content of 34.8% composed of a polysiloxane segment (a1) and a vinyl polymer segment (a2).

Synthesis Example 14 (The Same as Above)

PnP of 67 g, IPA of 30 g, PTMS of 45 g, and DMDMS of 27 g were fed into a reaction vessel similar to that used in Synthesis example 1, which was heated up to 80° C. Next, a mixture of MMA of 94 g, BMA of 77 g, BA of 44 g, AA of 13 g, MPTS of 7 g, IPA of 12 g, and TBPEH of 12 g was added dropwise into the reaction vessel for four hours to allow for polymerization reaction. Two hours later after completion of the dropping, a mixture of "A-3" of 0.7 g and deionized water of 20 g was added dropwise for five minutes, and the resultant was thereafter stirred for 16 hours at the same temperature to allow for the hydrolysis-condensation reaction.

Next, TEA of 19 g and polysiloxane (PS-1) of 72 g were added into the reaction vessel, and dipentaerythritol hexaacrylate (DPHA) of 67 g was then added thereto. And deionized water of 533 g was also added. Thereafter, "BYK-020" of 0.3 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A11) of 1000 g with a non-volatile content of 40.3% composed of a polysiloxane segment (a1) and a vinyl polymer segment (a2).

Synthesis Example 15 (The Same as Above)

PnP of 67 g, IPA of 30 g, PTMS of 45 g, and DMDMS of 27 g were fed into a reaction vessel similar to that used in Synthesis example 1, which was heated up to 80° C. Next, a mixture of MMA of 94 g, BMA of 77 g, BA of 44 g, AA of 13 g, MPTS of 7 g, IPA of 12 g, and TBPEH of 12 g was added dropwise into the reaction vessel for four hours to allow for polymerization reaction. Two hours later after completion of the addition, a mixture of "A-3" of 0.7 g and deionized water of 20 g was added dropwise for five minutes, and the resultant was thereafter stirred for 16 hours at the same temperature to allow for the hydrolysis-condensation reaction.

Next, TEA of 19 g and polysiloxane (PS-1) of 72 g were added into the reaction vessel, and DPHA of 67 g was then added thereto. Thereafter, deionized water of 533 g was also added. Thereafter, "BYK-020" of 0.3 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A12) of 1000 g with a non-volatile content of 39.3% composed of a polysiloxane segment (a1) and a vinyl polymer segment (a2).

Synthesis Example 16 (The Same as Above)

PnP of 105 g, IPA of 75 g, PTMS of 88 g, and DMDMS of 53 g were fed into a reaction vessel similar to that used in Synthesis example 1, which was heated up to 80° C. Next, a mixture of MMA of 40 g, BMA of 84 g, 2-ethylhexylmethacrylate (2-EHMA) of 51 g, AA of 19 g, MPTS of 6 g, and TBPEH of 10 g was added dropwise into the reaction vessel for four hours to allow for polymerization reaction. Two hours later after completion of the dropping, a mixture of "A-3" of 1.4 g and deionized water of 40 g was added dropwise for five minutes, and the resultant was thereafter stirred for 16 hours at the same temperature to allow for the hydrolysis-condensation reaction.

Next, TEA of 26 g and polysiloxane (PS-1) of 147 g were added into the reaction vessel, and deionized water of 469 g was then added. Thereafter, "BYK-020" of 0.6 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A13) of 1000 g with a non-volatile content of 39.9% composed of a polysiloxane segment (a1) and a vinyl polymer segment (a2).

Synthesis Example 17 (The Same as Above)

PnP of 84 g, IPA of 60 g, PTMS of 71 g, and DMDMS of 43 g were fed into a reaction vessel similar to that used in Synthesis example 1, which was heated up to 80° C. Next, a mixture of MMA of 32 g, BMA of 67 g, 2-EHMA of 41 g, AA of 15 g, MPTS of 5 g, and TBPEH of 8 g was added dropwise into the reaction vessel for four hours to allow for polymerization reaction. Two hours later after completion of the dropping, a mixture of "A-3" of 1.1 g and deionized water of 32 g was added dropwise for five minutes, and the resultant was thereafter stirred for 16 hours at the same temperature to allow for the hydrolysis-condensation reaction.

Next, TEA of 21 g and polysiloxane (PS-1) of 110 g were added into the reaction vessel, and DPHA of 80 g was added. Next, deionized water of 495 g was added. Thereafter, "BYK-020" of 0.5 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A14) of 1000 g with a non-volatile content of 40.3% composed of a polysiloxane segment (a1) and a vinyl polymer segment (a2).

Synthesis Example 18 (The Same as Above)

PnP of 70 g, IPA of 50 g, PTMS of 59 g, and DMDMS of 36 g were fed into a reaction vessel similar to that used in Synthesis example 1, which was heated up to 80° C. Next, a mixture of MMA of 27 g, BMA of 56 g, 2-EHMA of 34 g, AA of 12 g, MPTS of 4 g, and TBPEH of 7 g was added dropwise into the reaction vessel for four hours to allow for polymerization reaction. Two hours later after completion of the addition, a mixture of "A-3" of 1 g and deionized water of 27 g was added dropwise for five minutes, and the resultant was thereafter stirred for 16 hours at the same temperature to allow for the hydrolysis-condensation reaction.

Next, TEA of 17 g and polysiloxane (PS-1) of 98 g were added into the reaction vessel, and DPHA of 133 g was added. Then, deionized water of 513 g was added. Thereafter, "BYK-020" of 0.4 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A15) of 1000 g with a non-volatile content of 40.2% composed of a polysiloxane segment (a1) and a vinyl polymer segment (a2).

Synthesis Example 19 (The Same as Above)

Procedures similar to those described in Synthesis example 18 were carried out, except that trimethylol propane triacrylate (TMPTA) of 133 mass parts was used in place of DPHA of 133 mass parts, thereby obtaining an aqueous dispersion (d-8) of hydrophilic group-containing composite resin (A16) of 1000 parts with a non-volatile content of 40.1% composed of a polysiloxane segment (a1) and a vinyl polymer segment (a2).

Synthesis Example 20 (The Same as Above)

Procedures similar to those described in Synthesis Example 18 were carried out, except that tripropylene glycol diacrylate (TPGDA) of 133 g was used in place of DPHA of 133 g, thereby obtaining an aqueous dispersion of hydrophilic group-containing composite resin (A17) of 1000 g with a non-volatile content of 40.1% composed of a polysiloxane segment (a1) and a vinyl polymer segment (a2).

Synthesis Example 21 (The Same as Above)

PnP of 70 g, IPA of 50 g, PTMS of 59 g, and DMDMS of 36 g were fed into a reaction vessel similar to that used in Synthesis Example 1, which was heated up to 80° C. Next, a mixture of MMA of 27 g, BMA of 56 g, 2-EHMA of 34 g, AA of 12 g, MPTS of 4 g, and TBPEH of 7 g was added dropwise into the reaction vessel for four hours to allow for polymerization reaction. Two hours later after completion of the dropping, a mixture of "A-3" of 1 g and deionized water of 27 g was added dropwise for five minutes, and the resultant was thereafter stirred for 16 hours at the same temperature to allow for the hydrolysis-condensation reaction.

Next, TEA of 17 g and polysiloxane (PS-2) of 99 g were added into the reaction vessel, and DPHA of 133 g was added. Next, deionized water of 513 g was added. Thereafter, "BYK-020" of 0.4 g was added to obtain a reaction product. The reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A18) of 1000 g with a non-volatile content of 40.3% composed of a polysiloxane segment (a1) and a vinyl polymer segment (a2).

Synthesis Example 22 (The Same as Above)

PTMS of 70 g and DMDMS of 43 g were fed into a reaction vessel similar to that used in Synthesis Example 1, which was heated up to 100° C. Next, a mixture of MMA of 59 g, AA of 16 g, MPTS of 5 g and TBPEH of 8 g was added dropwise into the reaction vessel for four hours and thereafter, the resultant was stirred for 16 hours at the same temperature.

Next, the reaction vessel was adjusted to a temperature of 80° C., and MPTS of 66 g was added to allow for polymerization reaction. After the addition, a mixture of "A-3" of 1.6 g and deionized water of 23.2 g was added dropwise for five minutes, thereafter, the resultant was stirred for 16 hours at the same temperature to allow for the hydrolysis-condensation reaction. Next, PnP of 100 g was added. Two-hour distillation was carried out under reduced pressure of 10 to 300 mmHg at temperatures of 40° C. to 60° C., thereby removing the produced methanol and water. Next, DPHA of 100 g and 2-dimethyl amino ethanol (DMAE) of 20 g were added, and deionized water of 580 g was also added, thereby obtaining an aqueous dispersion of hydrophilic group-containing composite resin (A19) of 1000 g with a non-volatile content of 30.5% composed of a polysiloxane segment (a1) and a vinyl polymer segment (a2).

Synthesis Example 23 (The Same as Above)

PTMS of 53 g and DMDMS of 61 g were fed into a reaction vessel similar to that used in Synthesis example 1, which was heated up to 90° C. Next, a mixture of MMA of 59 g, AA of 16 g, MPTS of 5 g and TBPEH of 8 g was added dropwise into the reaction vessel for four hours and thereafter, the resultant was stirred for 16 hours at the same temperature.

Next, the reaction vessel was adjusted to a temperature of 80° C., and MPTS of 66 g was added. After the addition, a mixture of "A-3" of 1.7 g and deionized water of 24 g was added dropwise for five minutes, thereafter, the resultant was stirred for 16 hours at the same temperature to allow for the hydrolysis-condensation reaction. Next, PnP of 100 g was added. Two-hour distillation was carried out under reduced pressure of 10 to 300 mmHg at temperatures of 40° C. to 60° C., thereby removing the produced methanol and water. Next, DPHA of 100 g and DMAE of 20 g were added, and deionized water of 580 g was also added, thereby obtaining an aqueous dispersion of hydrophilic group-containing composite resin (A20) of 1000 g with a non-volatile content of 30.4% composed of a polysiloxane segment (a1) and a vinyl polymer segment (a2).

Synthesis Example 24 (The Same as Above)

PnP of 130 g, PTMS of 60 g and DMDMS of 99 g were fed into a reaction vessel similar to that used in Synthesis example 1, which was heated up to 80° C. Next, a mixture of MMA of 26 g, BMA of 25 g, BA of 18 g, AA of 16 g, MPTS of 3 g, PnP of 4 g and TBPEH of 4 g was added dropwise into the reaction vessel for four hours to allow for polymerization reaction. Two hours later after completion of the addition, the reaction vessel was adjusted to a temperature of 120° C., and kept for two hours at the same temperature. Thereafter, the reaction vessel was adjusted to a temperature of 80° C. A mixture of "A-3" of 0.016 g and deionized water of 45 g was added dropwise for five minutes, and the resultant was thereafter stirred for 16 hours at the same temperature to allow for the hydrolysis-condensation reaction.

Next, polysiloxane (PS-3) of 173 g and MPTS of 47 g were added to the reaction vessel, and deionized water of 40 g was added. Thereafter, the reaction vessel was kept at 80° C. for four hours. Next, the reaction product was distilled for two hours under reduced pressure of 10 to 300 mmHg at temperatures of 40° C. to 60° C., thereby removing the produced methanol and water. Thereafter, TEA of 18 g and deionized water of 498 g were added, thereby obtaining an aqueous dispersion of hydrophilic group-containing composite resin (A21) of 1000 g with a non-volatile content of 35.6% composed of a polysiloxane segment (a1) and a vinyl polymer segment (a2).

Synthesis Example 25 (The Same as Above)

PnP of 107.9 g, PTMS of 50 g and DMDMS of 83 g were fed into a reaction vessel similar to that used in Synthesis example 1, which was heated up to 80° C. Next, a mixture of MMA of 22 g, BMA of 21 g, BA of 15 g, AA of 14 g, MPTS of 2 g, PnP of 4 g and TBPEH of 4 g was added dropwise into the reaction vessel for four hours to allow for polymerization reaction. Two hours later after completion of the addition, the reaction vessel was adjusted to a temperature of 120° C., and kept for two hours at the same temperature. Thereafter, the reaction vessel was adjusted to a temperature of 80° C. A mixture of "A-3" of 0.014 g and deionized water of 38 g was added dropwise for five minutes, and the resultant was thereafter stirred for 16 hours at the same temperature to allow for the hydrolysis-condensation reaction.

Next, polysiloxane (PS-3) of 145 g and MPTS of 39 g were added into the reaction vessel, and deionized water of 33 g was added thereto. Thereafter, the reaction vessel was kept at 80° C. for four hours to obtain a reaction product. Next, the reaction product was distilled for two hours under reduced pressure of 10 to 300 mmHg at temperatures of 40° C. to 60° C., thereby removing the produced methanol and water. Thereafter, DPHA of 58 g, PnP of 18 g, TEA of 19 g, and deionized water of 520 g were added, thereby obtaining an aqueous dispersion of hydrophilic group-containing composite resin (A22) of 1000 g with a non-volatile content of 34.6% composed of a polysiloxane segment (a1) and a vinyl polymer segment (a2).

Synthesis Example 26 (The Same as Above)

PnP of 54 g, IPA of 25 g, PTMS of 36 g and DMDMS of 22 g were fed into a reaction vessel similar to that used in Synthesis Example 1, which was heated up to 80° C. Next, a mixture of MMA of 76 g, BMA of 53 g, BA of 36 g, AA of 20 g, MPTS of 6 g, IPA of 9 g, PnP of 4 g and TBPEH of 9 g was added dropwise into the reaction vessel for four hours to allow for polymerization reaction. Two hours later after completion of the dropping, a mixture of "A-3" of 0.5 g and deionized water of 13 g was added dropwise for five minutes, thereafter, the resultant was stirred for 16 hours at the same temperature to allow for the hydrolysis-condensation reaction.

Next, GMA of 19 g, TEA of 12 g, polysiloxane (PS-1) of 63 g and DFHA of 58 g were added into the reaction vessel, and deionized water of 550 g was added thereto. Thereafter, "BYK-020" of 0.3 g was also added to obtain a reaction product. Next, the reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A23) of 1000 g with a non-volatile content of 35.0% composed of a polysiloxane segment (a1) and a vinyl polymer segment (a2).

Synthesis Example 27

Preparation of Reference Composite Resin (A'1)

PTM of 191 g was fed into a reaction vessel similar to that used in synthesis example 1, which was heated up to 120° C. Next, a mixture of MMA of 169 g, MPTS of 11 g and TBPEH of 18 g was added dropwise into the reaction vessel for four hours. Thereafter, the resultant was stirred for 16 hours at the same temperature to prepare a vinyl polymer (a2-1-8) having a trimethoxy silyl group.

Next, the reaction vessel was adjusted to a temperature of 80° C., and MTMS of 454 g and DMDMS of 116 g were added into the reaction vessel. Thereafter, a mixture of "A-3" of 8.4 g and deionized water of 134 g was added dropwise for five minutes and stirred for two hours at the same temperature, by which the hydrolysis-condensation reaction was allowed to proceed to obtain a reaction product. The reaction product was subjected to $^1$H-NMR analysis to find that almost 100% of trimethoxy silyl groups contained in the vinyl polymer (a2-1-8) were hydrolyzed. Thereafter, the reaction product was distilled for two hours under reduced pressure of 10 to 300 mmHg at temperatures of 40° C. to 60° C., by which the produced methanol and water were removed. Next, BuAc of 400 g was added to obtain a solution of reference composite resin (A'1) of 1000 g with a non-volatile content of 60.1% and composed of a polysiloxane segment (a'1) free of polymerizable double bonds and a vinyl polymer segment (a2).

Synthesis Example 28 (The Same as Above)

Toluene of 400 g was fed into a reaction vessel similar to that used in Synthesis example 1, which was heated up to 80° C. Next, a mixture of MMA of 200 g, AA of 25 g, methacryloyl polydimethyl siloxane [SILAPLANE] FM-0721: MW (mass average molecular weight) of 5000 by Chisso Corporation] of 50 g and TBPEH of 18 g was added dropwise into the reaction vessel for four hours, and, thereafter, stirred for 20 hours at the same temperature. Next, GMA of 50 g and 2-MIZ of 2.5 g were added and the resultant was stirred for four hours at the same temperature, thereby obtaining a solution of polydimethyl siloxane graft resin of 725 g with a non-volatile content of 44.2% by mass. Hereinafter, the solution is referred to as a solution of reference composite resin (A'2).

Synthesis Example 29 (The Same as Above)

PnP of 105 g, IPA of 75 g, PTMS of 88 g and DMDMS of 53 g were fed into a reaction vessel similar to that used in Synthesis example 1, which was heated up to 80° C. Next, a mixture of MMA of 40 g, BMA of 84 g, 2-EHMA of 51 g, AA of 19 g, MPTS of 6 g, and TBPEH of 10 g was added dropwise into the reaction vessel for four hours to allow for polymerization reaction. Two hours later after completion of the dropping, a mixture of "A-3" of 1.4 g and deionized water of 40 g was added dropwise for five minutes, and thereafter, the resultant was stirred for 16 hours at the same temperature to allow for the hydrolysis-condensation reaction.

Next, TEA of 26 g and polysiloxane (PS-3) of 157 g were added into the reaction vessel, and deionized water of 469 g was added thereto. Thereafter, "BYK-020" of 0.6 g was also added to obtain a reaction product. Next, the reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A'3) of 1000 g with a non-volatile content of 40.2% composed of a polysiloxane segment (a'1) free of polymerizable double bonds and a vinyl polymer segment (a2).

Synthesis Example 30 (The Same as Above)

PnP of 36 g, IPA of 80 g, PTMS of 54 g and DMDMS of 32 g were fed into a reaction vessel similar to that used in Synthesis example 1, which was heated up to 80° C. Next, a mixture of MMA of 112 g, BMA of 92 g, BA of 52 g, AA of 16 g, MPTS of 8 g, PnP of 14 g and TBPEH of 14 g was added dropwise into the reaction vessel for four hours to allow for polymerization reaction. Two hours later after completion of the addition, a mixture of "A-3" of 0.9 g and deionized water of 24 g was added dropwise for five minutes, and thereafter, the resultant was stirred for 16 hours at the same temperature to allow for the hydrolysis-condensation reaction.

Next, TEA of 18 g and polysiloxane (PS-3) of 93 g were added into the reaction vessel, and deionized water of 550 g was added thereto. Thereafter, "BYK-020" of 0.4 g was also added to obtain a reaction product. Next, the reaction product was distilled for two hours under reduced pressure of 10 to 300 mmHg at temperatures of 40° C. to 60° C., thereby removing IPA, the produced methanol and water to obtain an aqueous dispersion of hydrophilic group-containing composite resin (A'4) of 1000 g with a non-volatile content of 40.0% composed of a polysiloxane segment (a' 1) free of polymerizable double bonds and a vinyl polymer segment (a2).

Synthesis examples 1 through 30 are summarized in Tables 1 through 8.

TABLE 1

| | | | Synthesis example 1 | Synthesis example 2 | Synthesis example 3 | Synthesis example 4 | Synthesis example 5 |
|---|---|---|---|---|---|---|---|
| Composite resin | | | A1 | A2 | A3 | A4 | A5 |
| Polysiloxane segment-constituting silane compound | PTMS | g | 191 | 191 | 264 | 250 | 191 |
| | MTMS | | 131 | 131 | 181 | 172 | 131 |
| | DMDMS | | 116 | 116 | | 151 | 116 |
| | APTS | | 226 | 226 | 226 | 113 | |
| | MPTS | | | | | | 221 |
| Vinyle monomer constituting polymer segment | MMA | | 169 | 175 | 169 | 169 | 169 |
| | MPTS | | 11 | 5 | 11 | 11 | 11 |
| Initiator | TBPEH | | 18 | 5.4 | 18 | 18 | 18 |
| Solvent | BuAc | | | 400 | 400 | 400 | 400 |
| Polysiloxane segment/polymer segment (weight ratio) | | | 70/30 | 70/30 | 70/30 | 70/30 | 70/30 |
| Non-volatile contents (%) | | | 99.4 | 99.6 | 60.3 | 60.0 | 59.6 |
| Storage stability | | | 2.5 | 2.6 | 1.0 | 1.1 | 1.0 |

TABLE 2

| | | | Synthesis example 6 | Synthesis example 7 | Synthesis example 8 |
|---|---|---|---|---|---|
| Composite resin | | | A6 | A7 | A8 |
| Polysiloxane segment-constituting | PTMS | g | 218 | 164 | 191 |
| | MTMS | | 150 | 113 | 131 |

TABLE 2-continued

|  |  | Synthesis example 6 | Synthesis example 7 | Synthesis example 8 |
|---|---|---|---|---|
| silane compound | DMDMS | 132 | 99 | 116 |
|  | APTS | 258 | 194 | 226 |
| Polymer segment-constituting vinyl monomer | MMA | 113 | 226 | 121 |
|  | MPTS | 7 | 14 | 10 |
|  | AA |  |  | 33 |
|  | GMA |  |  | 16 |
| Initiator | TBPEH | 12 | 24 | 16 |
| Solvent | BuAc | 400 | 400 | 400 |
| Polysiloxane segment/polymer segment (weight ratio) |  | 80/20 | 60/40 | 70/30 |
| Non-volatile contents (%) |  | 60.1 | 59.8 | 59.8 |
| Storage stability |  | 1.1 | 1.1 | 1.4 |

TABLE 3

|  |  |  | Synthesis example 9 | Synthesis example 10 | Synthesis example 11 |
|---|---|---|---|---|---|
| Polysiloxane |  |  | PS-1 | PS-2 | PS-3 |
| Polysiloxane segment-constituting silane compound | MTMS | g | 415 | 440 | 1421 |
|  | MPTS |  | 756 |  |  |
|  | APTS |  |  | 756 |  |
| Active ingredient (%) |  |  | 75.0 | 75.0 | 70.0 |

TABLE 4

|  |  |  | Synthesis example 12 | Synthesis example 13 | Synthesis example 14 | Synthesis example 15 | Synthesis example 16 |
|---|---|---|---|---|---|---|---|
| Composite resin |  |  | A9 | A10 | A11 | A12 | A13 |
| Polysiloxane segment-constituting silane compound | PTMS | g | 54 | 44 | 45 | 45 | 88 |
|  | DMDMS |  | 33 | 26 | 27 | 27 | 53 |
|  | PS-1 |  | 87 | 76 | 72 |  | 147 |
|  | PS-2 |  |  |  |  | 72 |  |
| Polymer segment-constituting vinyl monomer | MMA |  | 113 | 92 | 94 | 94 | 40 |
|  | BMA |  | 92 | 64 | 77 | 77 | 84 |
|  | 2-EHMA |  |  |  |  |  | 51 |
|  | BA |  | 52 | 43 | 44 | 44 |  |
|  | AA |  | 16 | 25 | 13 | 13 | 19 |
|  | MPTS |  | 8 | 7 | 7 | 7 | 6 |
|  | GMA |  |  | 23 |  |  |  |
| Initiator | TBPEH |  | 14 | 11 | 12 | 12 | 10 |
| Polyfunctional acrylate | DPHA |  |  |  | 67 | 67 |  |
| Polysiloxane segment/polymer segment/polyfunctional acrylate (weight ratio) |  |  | 30/70/0 | 28/72/0 | 25/58/17 | 25/58/17 | 50/50/0 |
| Non-volatile contents (%) in aqueous dispersion |  |  | 40.0 | 34.8 | 40.3 | 39.3 | 39.9 |
| Storage stability |  |  | 1.0 | 1.0 | 1.1 | 1.1 | 1.0 |

TABLE 5

|  |  |  | Synthesis example 17 | Synthesis example 18 | Synthesis example 19 | Synthesis example 20 | Synthesis example 21 |
|---|---|---|---|---|---|---|---|
| Composite resin |  |  | A14 | A15 | A16 | A17 | A18 |
| Polysiloxane Segment-constituting silane compound | PTMS | g | 71 | 59 | 59 | 59 | 59 |
|  | DMDMS |  | 43 | 36 | 36 | 36 | 36 |
|  | PS-1 |  | 110 | 98 | 98 | 98 |  |
|  | PS-2 |  |  |  |  |  | 99 |
| Polymer segment-constituting vinyl monomer | MMA |  | 32 | 27 | 27 | 27 | 27 |
|  | BMA |  | 67 | 56 | 56 | 56 | 56 |
|  | 2-EHMA |  | 41 | 34 | 34 | 34 | 34 |
|  | BA |  |  |  |  |  |  |
|  | AA |  | 15 | 12 | 12 | 12 | 12 |
|  | MPTS |  | 5 | 4 | 4 | 4 | 4 |
| Initiator | TBPEH |  | 8 | 7 | 7 | 7 | 7 |
| Polyfunctional acrylate | DPHA |  | 80 | 133 |  |  | 133 |
|  | TMPTA |  |  |  | 133 |  |  |
|  | TPGDA |  |  |  |  | 133 |  |
| Polysiloxane segment/polymer segment/polyfunctional acrylate (weight ratio) |  |  | 40/40/20 | 33/33/33 | 33/33/33 | 33/33/33 | 33/33/33 |
| Non-volatile contents (%) in aqueous dispersion |  |  | 40.3 | 40.2 | 40.1 | 40.1 | 40.3 |
| Storage stability |  |  | 1.1 | 1.2 | 1.2 | 1.2 | 1.2 |

TABLE 6

|  |  | Synthesis example 22 | Synthesis example 23 | Synthesis example 24 | Synthesis example 25 | Synthesis example 26 |
|---|---|---|---|---|---|---|
| Composite resin |  | A19 | A20 | A21 | A22 | A23 |
| Polysiloxane segment-constituting silane compound | PTMS g | 70 | 53 | 60 | 50 | 36 |
|  | DMDMS | 43 | 61 | 99 | 83 | 22 |
|  | MPTS | 66 | 66 | 47 | 39 |  |
|  | PS-1 |  |  |  |  | 63 |
|  | PS-3 |  |  | 173 | 145 |  |
| Polymer segment-constituting vinyl monomer | MMA | 59 | 59 | 26 | 22 | 76 |
|  | BMA |  |  | 25 | 21 | 53 |
|  | BA |  |  | 18 | 15 | 36 |
|  | AA | 16 | 16 | 16 | 14 | 20 |
|  | MPTS | 5 | 5 | 3 | 2 | 6 |
|  | GMA |  |  |  |  | 19 |
| Initiator | TBPEH | 8 | 8 | 4 | 4 | 9 |
| Polyfunctional acrylate | DPHA | 100 | 100 |  | 58 | 58 |
| Polysiloxane segment/polymer segment/polyfunctional acrylate (weight ratio) |  | 40/27/33 | 40/27/33 | 75/25/0 | 63/20/17 | 23/60/17 |
| Non-volatile contents (%) in aqueous dispersion |  | 30.5 | 30.4 | 35.6 | 34.6 | 35.0 |
| Storage stability |  | 1.1 | 1.1 | 1.0 | 1.1 | 1.8 |

TABLE 7

|  |  | Synthesis example 27 | Synthesis example 28 |
|---|---|---|---|
| Composite resin |  | A'1 | A'2 |
| Polysiloxane segment-constituting silane compound | PTMS g | 191 |  |
|  | MTMS | 454 |  |
|  | DMDMS | 116 |  |
|  | FM-0721 |  | 50 |
| Polymer segment-constituting vinyl monomer | MMA | 169 | 200 |
|  | MPTS | 11 |  |
|  | AA | — | 25 |
|  | GMA | — | 50 |
| Initiator | TBPEH | 18 | 18 |
| Solvent | BuAc | 400 |  |
|  | Toluene |  | 400 |
| Polysiloxane segment/polymer segment (weight ratio) |  | 70/30 | 15/85 |
| Non-volatile contents (%) |  | 60.1 | 44.2 |
| Storage stability |  | 1.0 | Not measured |

TABLE 8

|  |  | Synthesis example 29 | Synthesis example 30 |
|---|---|---|---|
| Hydrophilic group-containing composite resin aqueous dispersion |  | A'3 | A'4 |
| Polysiloxane segment-constituting silane compound | PTMS g | 88 | 54 |
|  | DMDMS | 53 | 32 |
|  | PS-3 | 157 | 93 |
| Polymer segment constituting-vinyl monomer | MMA | 40 | 112 |
|  | BMA | 84 | 92 |
|  | 2-EHMA | 51 |  |
|  | BA |  | 52 |
|  | AA | 19 | 16 |
|  | MPTS | 6 | 8 |
| Initiator | TBPEH | 10 | 14 |
| Polysiloxane segment/polymer segment/polyfunctional acrylate (weight ratio) |  | 50/50/0 | 30/70/0 |
| Non-volatile contents (%) |  | 40.2 | 40.0 |
| Storage stability |  | 1.0 | 1.0 |

Footnotes given in Tables 1 through 8
"PTMS": phenyltrimethoxy silane
"MTMS": methyltrimethoxy silane
"DMDMS": dimethyl dimethoxy silane
"APTS": 3-acryloyl oxypropyltrimethoxy silane
"MPTS": 3-methacryloyl oxypropyltrimethoxy silane
"MMA": methylmethacrylate
"AA": acryl acid
"GMA": glycidyl methacrylate
"TBPEH": tert-butylperoxy-2ethyl hexanoate
"BuAc": butyl acetate
"BMA": butylmethacrylate
"2-EHMA": 2-ethylhexylmethacrylate
"BA": butylacrylate
"DPHA": dipentaerythritol hexaacrylate
"TMPTA": trimethylol propane triacrylate
"TPGDA": tripropylene glycol diacrylate
"FM-0721": SILAPLANE FM-0721 with weight average molecular weight of 5000, or methacryloyl polydimethyl siloxane by Chisso Corporation "Storage stability" described in Tables is a value obtained by dividing viscosities (viscosities with time) after a composite resin, a solution of composite resin and an aqueous dispersion of composite resin obtained in the synthesis examples are allowed to stand at 40° C. for 30 days by those (initial viscosities) obtained before they are allowed to stand for 30 days. If these substances have the viscosities substantially in a range of 1.0 to 3.0, they may be used as coating media or the like.

Embodiment 1

The composite resin A1 of 30 parts by weight obtained in Synthesis example 1, DPHA of 30 parts by weight and IRGACURE 184 [photo initiator made by Ciba Specialty Chemicals] of 2.4 parts by weight were well mixed and then stirred, thereby obtaining an ultraviolet-curable resin composition 1 (transparent ultraviolet-curable coating 1). The ultraviolet-curable resin composition 1 was used to prepare a cured coating film, which was evaluated for gel fraction, appearance, pencil hardness, solvent resistance, acid resistance and alkali resistance according to the following methods.

"Gel fraction": The ultraviolet-curable resin composition 1 was coated on a polypropylene plate so as to give 20 μm in thickness of a cured coating film, and allowed to dry for two minutes at a temperature of 80° C. Thereafter, the coating was cured at an irradiated level of about 2000 mJ under a high-pressure mercury lamp of 80 W/cm². Next, the thus obtained cured coating film was peeled off from the polypropylene plate to measure the weight (initial mass). After the measurement, the cured coating film was submerged into acetone at 25° C. for 24 hours, and measured for weight (weight with time) after the submersion. The thus measured weight was used to evaluate a gel fraction by referring to a value of (mass with time/initial mass)×100. It is to be noted that although the gel fraction of an ultraviolet-curable aqueous resin composition varies depending on use purposes and others, for example, where the ultraviolet-curable aqueous resin composition is used as a coating, the gel fraction is preferably at 70% or higher.

"Coating appearance": The ultraviolet-curable resin composition 1 was coated on a glass plate so as to give 20 μm in thickness of a cured coating film, and allowed to dry for two minutes at a temperature of 80° C. Thereafter, the cured coating film was obtained at an irradiated level of about 2000 mJ under a high-pressure mercury lamp of 80 W/cm². The cured coating film was visually observed for the condition, and the film which did not turn into white at all was judged to be (Better), that which turned into white to some extent was judged to be (Good) and that which all turned into white was judged to be (POOR).

Coating was performed on an electrodeposit intermediate coating wet rubbing plate (coated plate obtained by subjecting to wet grinding a coated steel plate on which polyester/melamine coating was coated) made by Nippon Route Service Co., Ltd., so as to give 20 μm in thickness of a cured coating film, after the coating was allowed to dry at a temperature of 80° C. for two minutes, it was exposed to an irradiated level of about 2000 mJ under a high-pressure mercury lamp of 80 W/cm². The obtained coating film was used for tests for "pencil hardness," "solvent resistance," and "acid resistance."

"Pencil hardness": Measured on the basis of JIS K-5600-5-4.

"Solvent resistance": Methylethyl ketone-impregnated felt paper was used to rub 50-times reciprocating on a cured coating, and thereafter, the cured coating was observed for the conditions by touching and visual observation. The evaluation was made on the basis of the following.

Better: No softening or decreased gloss was observed.

Good: Softening or decreased gloss was observed to some extent.

POOR: Apparent softening or decreased gloss was observed.

"Acid resistance": A part of the cured coating film was submerged into a 5% by weight sulfuric acid solution and allowed to stand at 25° C. for 24 hours. The cured coating film after standing was washed with water, and the cured coating after drying was visually evaluated for the surface conditions. The evaluation was made on the basis of the following.

Better: No etching traces were observed.

Good: Some etching traces were observed.

POOR: Etching was remarkably observed.

"Alkali resistance": A part of the cured coating film was submerged into a 5% by weight sodium hydroxide solution and allowed to stand at 25° C. for 24 hours. The cured coating after standing was washed with water, and the cured coating after drying was visually evaluated for the surface conditions. The evaluation was made on the basis of the following.

Better: No etching traces were observed.

Good: Some etching traces were observed.

POOR: Etching was remarkably observed.

Embodiments 2 Through 34 and Comparative Examples 1 Through 4

On the basis of the formulations shown in Tables 9 through 16, ultraviolet-curable resin compositions 2 to 34 and reference ultraviolet-curable resin compositions 1' to 4' were prepared in a method similar to that used in Embodiment 1. Evaluation was made similarly as in Embodiment 1, the results of which are shown in Tables 9 through 16.

TABLE 9

| | | | Embodiments | | | | | |
| --- | --- | --- | --- | --- | --- | --- | --- | --- |
| | | | 1 | 2 | 3 | 4 | 5 | 6 |
| Ultraviolet-curable resin composition | | | 1 | 2 | 3 | 4 | 5 | 6 |
| Formation | Composite resin (A) | Parts by weight | | | | | | |
| | Composite resin (A1) | | 30 | 30 | 30 | | | |
| | Composite resin (A2) | | | | | 30 | | |
| | Solution of composite resin (A3) | | | | | | 50 | |
| | Solution of composite resin (A4) | | | | | | | 50 |
| | Photoreaction curing agent (B) | | | | | | | |
| | IRGACURE 184 | | 2.4 | 1.8 | 1.2 | 2.4 | 2.4 | 2.4 |
| | Reactive diluent | | | | | | | |
| | DPHA | | 30 | 15 | 0 | 30 | 30 | 30 |
| C | Gel fraction (% by mass) | | 98 | 95 | 88 | 98 | 99 | 96 |
| | Coating appearance | | Better | Better | Better | Better | Better | Better |
| | Pencil hardness | | 4H | H | H | 5H | 5H | 3H |
| | Solvent resistance | | Better | Better | Better | Better | Better | Better |
| | Acid resistance | | Better | Better | Better | Better | Better | Better |
| | Alkali resistance | | Better | Better | Better | Better | Better | Better |

TABLE 10

| | | | Embodiments | | | | | |
|---|---|---|---|---|---|---|---|---|
| | | | 7 | 8 | 9 | 10 | 11 | 12 |
| Ultraviolet-curable resin composition | | | 7 | 8 | 9 | 10 | 11 | 12 |
| Formation | Composite resin (A) | Parts by weight | | | | | | |
| | Solution of composite resin (A5) | | 50 | 50 | 50 | | | |
| | Solution of composite resin (A6) | | | | | 50 | | |
| | Solution of composite resin (A7) | | | | | | 50 | |
| | Solution of composite resin (A8) | | | | | | | 50 |
| | Photoreaction curing agent (B) | | | | | | | |
| | IRGACURE 184] | | 2.4 | 1.8 | 1.2 | 2.4 | 2.4 | 2.4 |
| | Reactive diluent | | | | | | | |
| | DPHA | | 30 | 15 | | 30 | 30 | 30 |
| Coating | Gel fraction (% by mass) | | 98 | 95 | 88 | 98 | 97 | 98 |
| | Coating appearance | | Better | Better | Better | Better | Better | Better |
| | Pencil hardness | | 4H | H | H | 4H | 4H | 5H |
| | Solvent resistance | | Better | Better | Better | Better | Better | Better |
| | Acid resistance | | Better | Better | Better | Better | Better | Better |
| | Alkali resistance | | Better | Better | Better | Better | Better | Better |

TABLE 11

| | | | Embodiments | | | | | |
|---|---|---|---|---|---|---|---|---|
| | | | 13 | 14 | 15 | 16 | 17 | 18 |
| Ultraviolet-curable resin composition | | | 13 | 14 | 15 | 16 | 17 | 18 |
| Formation | Composite resin (A) | Parts by weight | | | | | | |
| | Aqueous dispersion of composite resin (A9) | | 100 | 100 | 100 | | | |
| | Aqueous dispersion of composite resin (A10) | | | | | 100 | | |
| | Aqueous dispersion of composite resin (A11) | | | | | | 100 | |
| | Aqueous dispersion of composite resin (A12) | | | | | | | 100 |
| | Photoreaction curing agent (B) | | | | | | | |
| | IRGACURE 2959 | | 1.6 | 1.6 | | 1.4 | 1.6 | 1.6 |
| | IRGACURE 184 | | | | 1.6 | | | |
| | Curing agent | | | | | | | |
| | GPTS | | | 5.2 | | | | |
| Coating performance | Gel fraction (% by mass) | | 82 | 93 | 83 | 92 | 85 | 81 |
| | Coating appearance] | | Better | Better | Better | Better | Better | Better |
| | Pencil hardness | | H | 2H | H | 2H | 2H | 2H |
| | Solvent resistance | | Good | Better | Good | Better | Good | Good |
| | Acid resistance | | Better | Better | Better | Better | Better | Better |

TABLE 12

| | | | Embodiments | | | | | |
|---|---|---|---|---|---|---|---|---|
| | | | 19 | 20 | 21 | 22 | 23 | 24 |
| Ultraviolet-curable resin composition | | | 19 | 20 | 21 | 22 | 23 | 24 |
| Formation | Composite resin (A) | Parts | | | | | | |
| | Aqueous dispersion of composite resin (A13) | | 100 | | | | | |
| | Aqueous dispersion of composite resin (A14) | | | 100 | | | | |
| | Aqueous dispersion of composite resin (A15) | | | | 100 | 100 | 100 | |
| | Aqueous dispersion of composite resin (A16) | | | | | | | 100 |

TABLE 12-continued

|  |  | Embodiments | | | | | |
|---|---|---|---|---|---|---|---|
|  |  | 19 | 20 | 21 | 22 | 23 | 24 |
|  | Photoreaction curing agent (B) | | | | | | |
|  | IRGACURE 2959 | 1.6 | 1.6 | 1.6 | 1.6 | 1.6 | 1.6 |
|  | Curing agent | | | | | | |
|  | DENACOL EX-614B | | | | | 3.0 | |
|  | GPTS | | | | 4.0 | | |
| Coating performance | Gel fraction (% by mass) | 82 | 86 | 93 | 96 | 94 | 93 |
|  | Coating appearance | Better | Better | Better | Better | Better | Better |
|  | Pencil hardness | 2H | 2H | 3H | 4H | 3H | 2H |
|  | Solvent resistance | Good | Better | Better | Better | Better | Better |
|  | Acid resistance | Better | Better | Better | Better | Better | Better |

TABLE 13

|  |  |  | Embodiments | | | | | |
|---|---|---|---|---|---|---|---|---|
|  |  |  | 25 | 26 | 27 | 28 | 29 | 30 |
| Ultraviolet-curable resin composition | | | 25 | 26 | 27 | 28 | 29 | 30 |
| Formation | Composite resin (A) | Parts by weight | | | | | | |
|  | Aqueous dispersion of composite resin (A17) | | 100 | | | | | |
|  | Aqueous dispersion of composite resin (A18) | | | 100 | | | | |
|  | Aqueous dispersion of composite resin (A19) | | | | 100 | | | |
|  | Aqueous dispersion of composite resin (A20) | | | | | 100 | | |
|  | Aqueous dispersion of composite resin (A21) | | | | | | 100 | |
|  | Aqueous dispersion of composite resin (A22) | | | | | | | 100 |
|  | Photoreaction curing agent (B) | | | | | | | |
|  | IRGACURE 2959 | | 1.6 | 1.6 | 1.2 | 1.2 | 1.4 | 1.4 |
| Coating performance | Gel fraction (% by mass) | | 92 | 93 | 86 | 89 | 85 | 90 |
|  | Coating appearance | | Better | Better | Better | Better | Better | Better |
|  | Pencil hardness | | 2H | 3H | 3H | 3H | H | 2H |
|  | Solvent resistance | | Better | Better | Better | Better | Good | Better |
|  | Acid resistance | | Better | Better | Better | Better | Better | Better |

TABLE 14

|  |  |  | 31 | 32 | 33 | 34 |
|---|---|---|---|---|---|---|
| Ultraviolet-curable resin composition | | | 31 | 32 | 33 | 34 |
| Formation | Composite resin (A) | Parts by weight | | | | |
|  | Aqueous dispersion of composite resin (A22) | | 100 | | | |
|  | Aqueous dispersion of composite resin (A23) | | | 100 | 100 | 100 |
|  | Photoreaction curing agent (B) | | | | | |
|  | IRGACURE 2959 | | 1.4 | 1.4 | 1.4 | 1.4 |
|  | Curing agent | | | | | |
|  | DENACOL EX-614B | | | | | 1.5 |
|  | GPTS | | 4.5 | | 2.0 | 1.5 |
| Coating performance | Gel fraction (% by mass) | | 92 | 91 | 93 | 95 |
|  | Coating appearance | | Better | Better | Better | Better |
|  | Pencil hardness | | 2H | 2H | 3H | 3H |
|  | Solvent resistance | | Better | Better | Better | Better |
|  | Acid resistance | | Better | Better | Better | Better |

TABLE 15

| | | | Comparative examples | |
|---|---|---|---|---|
| | | | 1 | 2 |
| Formation | Reference composite resin (A) | Parts by | | |
| | Solution of composite resin (A'1) | | 50 | |
| | Solution of composite resin (A'2) | | | 50 |
| | Photoreaction curing agent (B) | | | |
| | IRGACURE 184 | | 1.2 | 0.9 |
| Coating performance | Gel fraction (% by mass) | | No cured coating obtained | 82 |
| | Coating appearance | | | Poor |
| | Pencil hardness | | | F |
| | Solvent resistance | | | Better |
| | Acid resistance | | | Better |
| | Alkali resistance | | | Poor |

TABLE 16

| | | | Comparative examples | |
|---|---|---|---|---|
| | | | 3 | 4 |
| Formation | Reference composite resin (A') | Parts by weight | | |
| | Aqueous dispersion of composite resin (A'3) | | 100 | |
| | Aqueous dispersion of composite resin (A4) | | | 100 |
| | Photoreaction curing agent (B) | | | |
| | IRGACURE 2956 | | 1.4 | |
| | Curing agent | | | |
| | GPTS | | | 5.2 |
| Coating performance | Gel fraction (% by mass) | | No cured coating obtained | 90 |
| | Coating appearance | | | Better |
| | Pencil hardness | | | F |
| | Solvent resistance | | | Better |
| | Acid resistance | | | Better |

"DPHA": dipentaerythritol hexaacrylate

"IRGACURE 184": photo initiator made by Ciba Specialty Chemicals

"GPTS": 3-glycidoxy propyltrimethoxy silane

"DENACOL EX-614B": epoxy compound made by Nagase Chemtex Corporation

INDUSTRIAL APPLICABILITY

The ultraviolet-curable resin composition of the present invention provides a cured coating film excellent in durability through two curing mechanisms, that is, ultraviolet curing and improvement in crosslink density of a coating film by condensation reaction of a silanol group and/or a hydrolytic silyl group. As a result, the resin composition can be used with coating media for the exteriors of buildings in which a thermosetting resin composition would be otherwise used with difficulty and in coating media to be coated on a base material which easily thermally deforms. It can be also used in photocatalysis coating agents, inks, adhesive agents and binder resins of various types of films such as a gas barrier film.

The invention claimed is:

1. An ultraviolet-curable resin composition which comprises
a composite resin (A) which has a polysiloxane segment (a1) having a silanol group and/or a hydrolytic silyl group, as well as a polymerizable double bond and a polymer segment (a2) other than the polysiloxane segment (a1);
a photo initiator (B); and
a polyfunctional (meta) acrylate,
wherein the polysiloxane segment (a1) is a polysiloxane segment having a structural unit expressed by the following general formula (S-2) and (S-3),

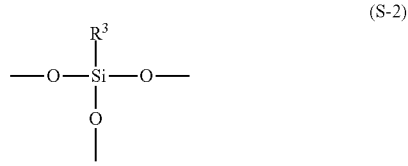

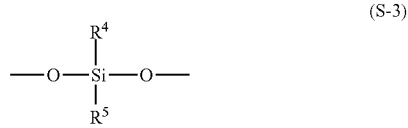

(in the general formulae (S-2) and (S-3), $R^3$, $R^4$ and $R^5$ each independently denotes an alkyl group of 1 to 6 carbon atoms, a cycloalkyl group or an aryl group of 3 to 8 carbon atoms and an aralkyl group of 7 to 12 of carbon atoms), and wherein the composite resin (A) is a composite resin in which the polysiloxane segment (a1) is bonded to the polymer segment (a2) in a structure expressed by the formula (S-5)

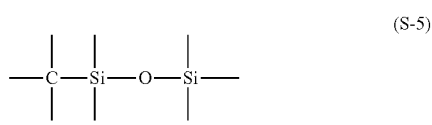

(in the formula, the carbon atom is a carbon atom constituting the polymer segment (a2), and two silicon atoms are silicon atoms constituting the polysiloxane segment (a1)).

2. The ultraviolet-curable resin composition according to claim 1, wherein the polysiloxane segment (a1) is a polysiloxane segment in which polymerizable double bonds are contained from 1 to 40% by weight on the basis of the weight of the polysiloxane segment.

3. The ultraviolet-curable resin composition according to claim 1, wherein the polysiloxane segment (a1) is contained from 10 to 95% by weight with respect to the composite resin (A).

4. The ultraviolet-curable resin composition according to claim 1, wherein the polymer segment (a2) is a vinyl polymer segment and/or a polyurethane polymer segment.

5. The ultraviolet-curable resin composition according to claim 1, further comprises an organic solvent.

6. The ultraviolet-curable resin composition according to claim 1, wherein the composite resin (A) is a composite resin having an anionic group.

7. The ultraviolet-curable resin composition according to claim 6, wherein the anionic group is a neutralized carboxyl group.

8. The ultraviolet-curable resin composition according to claim 6, wherein the anionic group is contained from 0.1 to 20% by weight on the basis of the weight of the composite resin (A).

9. The ultraviolet-curable resin composition according to claim 6, further comprises water.

10. The ultraviolet-curable resin composition according to claim 1, wherein the photo initiator (B) is one or more photo initiators which are selected from the group consisting of acetophenones, benzyl ketals, benzophenones and benzoins.

11. The ultraviolet-curable resin composition according to claim 10, wherein the photo initiator (B) is contained from 0.1 to 20% by weight with respect to a total weight of the composite resin (A) and the photo initiator (B).

12. An ultraviolet-curable coating which contains the ultraviolet-curable resin composition described in any one of claim 1.

13. A coated article which is obtained by coating the ultraviolet-curable coating medium described in claim 12.

* * * * *